(12) United States Patent
Tagawa et al.

(10) Patent No.: US 6,834,348 B1
(45) Date of Patent: Dec. 21, 2004

(54) DIGITAL DATA RECORDING APPARATUS, DIGITAL DATA RECORDING METHOD, AND COMPUTER-READABLE RECORDING MEDIUM

(75) Inventors: Kenji Tagawa, Katano (JP); Masataka Minami, Tsuna-gun (JP); Masayuki Kozuka, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/358,820

(22) Filed: Jul. 22, 1999

(30) Foreign Application Priority Data

Jul. 22, 1998 (JP) .......................................... 10-206967
Oct. 12, 1998 (JP) .......................................... 10-289831

(51) Int. Cl.⁷ .............................................. G06F 11/30
(52) U.S. Cl. ..................... 713/193; 713/150; 713/201; 380/277
(58) Field of Search ............................... 713/201, 193, 713/150; 380/277

(56) References Cited

U.S. PATENT DOCUMENTS

| | | | |
|---|---|---|---|
| 4,853,962 A | * | 8/1989 | Brockman .................... 380/44 |
| 5,699,428 A | * | 12/1997 | McDonnal et al. ............ 380/4 |
| 5,912,969 A | | 6/1999 | Sasamoto et al. |
| 6,128,735 A | * | 10/2000 | Goldstein et al. ........... 713/166 |

FOREIGN PATENT DOCUMENTS

| | | | | |
|---|---|---|---|---|
| DE | 0862149 A2 | * | 9/1998 | ............. G07F/7/10 |
| EP | 0 679 977 | | 11/1995 | |
| EP | 0 704 785 | | 4/1996 | |
| JP | 07249262 | | 9/1995 | |
| JP | 8-339629 | | 12/1996 | |
| JP | 0831653 A2 | * | 3/1998 | ............ H04N/7/16 |
| JP | 11-191266 | | 7/1999 | |
| JP | 7-272399 | | 10/1999 | |

* cited by examiner

Primary Examiner—Kim Vu
Assistant Examiner—James Seal
(74) Attorney, Agent, or Firm—Wenderoth, Lind & Ponack, L.L.P.

(57) ABSTRACT

A data transmit/receive unit receives encrypted digital data distributed through an electronic music distribution system and records the digital data on a primary recording medium. Digital data have been encrypted in different encryption systems according to the distributers, and include attribute information indicating the encryption systems. The encryption system of digital data that has been extracted by a data extraction unit is judged by a judging unit and decrypted by an appropriate decryption unit. An inherent information obtaining unit obtains the identification information of a secondary recording medium or a playback apparatus according to whether the secondary recording medium can be removable from the playback apparatus. An encryption system designation unit selects one out of a plurality of encryption units according to the obtained identification information. The selected encryption unit creates a encryption key according to the identification information and encrypts the digital data. A recording unit records the digital data on the secondary recording medium. An accounting unit charges according to accounting information in the attribute information.

10 Claims, 25 Drawing Sheets

FIG. 2
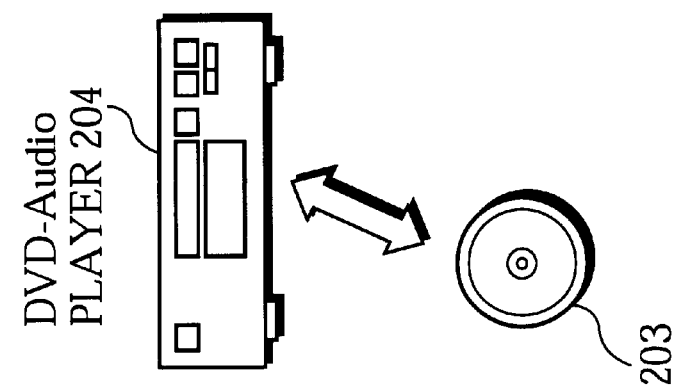
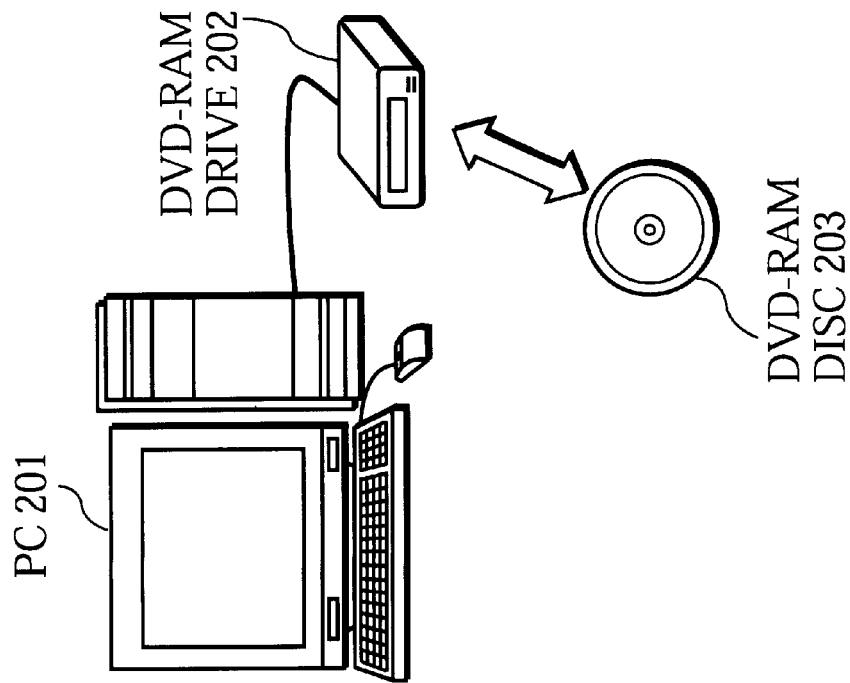

FIG. 3

| TITLE ~301 | SINGER ~302 | TIME ~303 | PRICE ~304 |
|---|---|---|---|
| Song1 | SingerA | 4'20" | ¥100 |
| Song2 | SingerB | 3'53" | ¥50 |
| Song3 | SingerC | 4'48" | ¥75 |
| Song4 | SingerD | 4'06" | ¥100 |
| ⋮ | ⋮ | ⋮ | ⋮ |
| ⋮ | ⋮ | ⋮ | ⋮ |

FIG. 5

| TITLE ~301 | SINGER ~302 | TIME ~303 | PRICE(1) ~501 | PRICE(2) ~502 |
|---|---|---|---|---|
| Song1 | SingerA | 4'20" | ¥100 | ¥70 |
| Song2 | SingerB | 3'53" | ¥50 | ¥35 |
| Song3 | SingerC | 4'48" | ¥75 | ¥50 |
| Song4 | SingerD | 4'06" | ¥100 | ¥100 |
| ⋮ | ⋮ | ⋮ | ⋮ | ⋮ |
| ⋮ | ⋮ | ⋮ | ⋮ | ⋮ |

FIG. 9

| TITLE | TITLE CODE | SINGER | DATA SOURCE |
|---|---|---|---|
| TITLE A | song01 | A | www. song/song01 |
| TITLE B | song02 | B | www. song/song02 |
| TITLE C | song03 | C | www. song/song03 |
| TITLE D | song04 | D | www. song/song04 |
| TITLE E | song05 | E | www. song/song05 |

Columns: 2201, 2202, 2203, 2204

FIG. 12

| TITLE | TITLE CODE | SINGER | DATA SOURCE | COPY CONTROL INFORMATION | PRICE |
|---|---|---|---|---|---|
| TITLE A | song01 | A | www.song/song01 | NO RECOPYING | ¥100 |
| TITLE B | song02 | B | www.song/song02 | NO LIMIT | ¥10 |
| TITLE C | song03 | C | www.song/song03 | NO RECOPYING | ¥0 |
| TITLE D | song04 | D | www.song/song04 | NO RECOPYING | ¥30 |
| TITLE E | song05 | E | www.song/song05 | COPYING TWICE | ¥10 |

FIG. 17

ATTRIBUTE INFORMATION 3201

| TITLE | PERFORMER | TITLE CODE | RECORDING CHARGE | CHARGE PER REPRODUCTION | MAXIMUM NUMBER OF REPRODUCING | ENCRYPTION CONDITION | COPY PERMISSION |
|---|---|---|---|---|---|---|---|
| MUSIC A | a | song01 | ¥100 | ¥0.5 | 100回 | ENCRYPTED | ONLY ONCE |
| MUSIC B | b | song02 | ¥10 | ¥0 | NO LIMIT | NOT ENCRYPTED | PERMITTED |
| MUSIC C | c | song03 | ¥0 | ¥1 | 50回 | ENCRYPTED | ONLY ONCE |
| MUSIC D | d | song04 | ¥30 | ¥5 | 50回 | ENCRYPTED | ONLY ONCE |
| MUSIC E | e | song05 | ¥10 | ¥0 | 10回 | NOT ENCRYPTED | PERMITTED |
| ... | ... | ... | ... | ... | ... | ... | ... |

MANAGEMENT INFORMATION 3301

| TITLE CODE (3204) | RECORDING START ADDRESS (3302) | RECORDING END ADDRESS (3303) |
|---|---|---|
| song01 | 00320 | 00933 |
| song02 | 14902 | 15172 |
| song03 | 13085 | 13994 |
| song04 | 50870 | 51825 |
| song05 | 58349 | 58783 |

FIG. 23

ATTRIBUTE INFORMATION 3801

| TITLE | PERFOR-MER | TITLE CODE | PRIMARY RECORDING CHARGE | SECONDARY RECORDING CHARGE | CHARGE PER REPRODUCTION | MAXIMUM NUMBER OF REPRODUCING | ENCRYPTION CONDITION | COPY PERMISSION (PRIMARY) | COPY PERMISSION (SECONDARY) | ... |
|---|---|---|---|---|---|---|---|---|---|---|
| MUSIC A | a | song01 | ¥0 | ¥100 | ¥0.5 | 100回 | ENCRYPTED | ONLY ONCE | ONLY ONCE | ... |
| MUSIC B | b | song02 | ¥10 | ¥10 | ¥0 | NO LIMIT | NOT ENCRYPTED | PERMITTED | PERMITTED | ... |
| MUSIC C | c | song03 | ¥0 | ¥0 | ¥1 | 50回 | ENCRYPTED | ONLY ONCE | ONLY ONCE | ... |
| MUSIC D | d | song04 | ¥0 | ¥30 | ¥5 | 50回 | ENCRYPTED | ONLY ONCE | ONLY ONCE | ... |
| MUSIC E | e | song05 | — | — | — | — | NOT ENCRYPTED | NOT PERMITTED | NOT PERMITTED | ... |

3805　3802　3803　3804

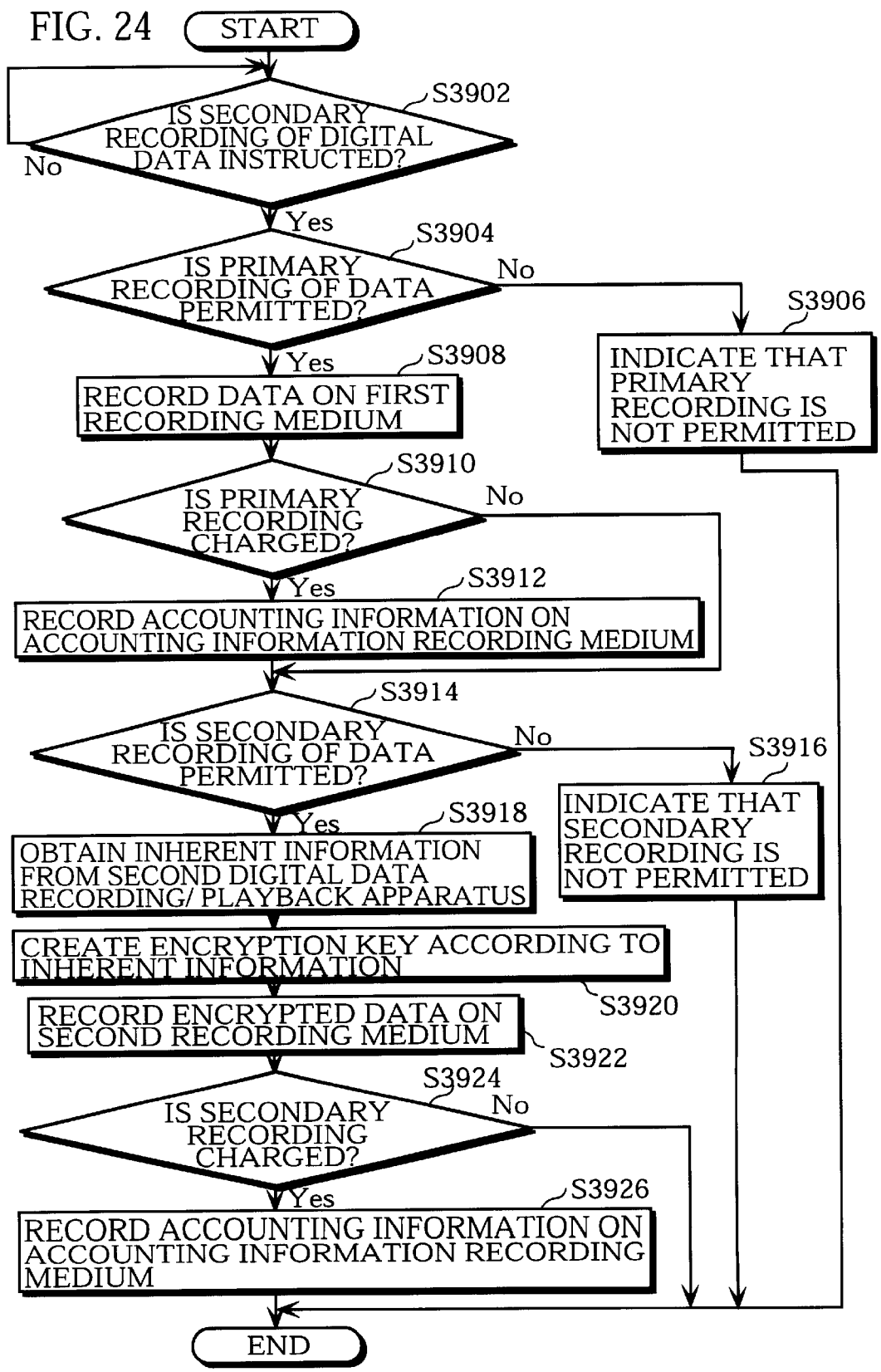

FIG. 25

| TITLE CODE | ATTRIBUTE INFORMATION 31001 | | | |
|---|---|---|---|---|
| | SECONDARY RECORDING CHARGE | | | ... |
| | MEDIUM ID | APPARATUS ID | MEDIUM ID+ APPARATUS ID | |
| ... | ... | ... | ... | ... |
| song01 | ¥100 | ¥10 | ¥10 | ... |
| song02 | ¥10 | ¥1 | ¥1 | ... |
| song03 | ¥0 | ¥0 | ¥0 | ... |
| song04 | ¥30 | ¥3 | ¥3 | ... |
| song05 | ¥10 | ¥1 | ¥1 | ... |
| ... | ... | ... | ... | ... |

DIGITAL DATA RECORDING APPARATUS, DIGITAL DATA RECORDING METHOD, AND COMPUTER-READABLE RECORDING MEDIUM

This application is based on application Nos. 10-206967 and 10-289831 filed in Japan, the contents of which are hereby incorporated by reference.

BACKGROUND OF THE INVENTION

1. Field of the Invention

The present invention relates to a digital data recording apparatus, a digital data recording method, and a computer-readable recording medium for protecting copyrights of digital data.

2. Description of the Related Art

Thanks to the recent widespread use of the Internet, distribution of music with so-called EC (Electronic Commerce) has been developed, in which desired music data is downloaded from a homepage using a PC (Personal Computer) and the bill is charged to a credit card, for instance. The widespread of the music distribution through the Internet using the EC (referred to "electronic music distribution" in this specification) would reduce the necessity for consumers to go to record shops and might drastically change the distribution of music, which has been mainly distributed by CDs (Compact Discs).

Meanwhile, many people listen to music not only at home but also on their way to office, school, home, and in a car using a portable playback apparatus and the like. In these cases, music data must be recorded on a portable medium such as an MD (Mini Disc).

Regarding electronic music distribution, delivery companies adopt a variety of encryption systems to protect copyrights. More specifically, a different optimum encryption system is adopted according to the manufacturing company, the distribution route, the usage pattern, and the like. Under the circumstances, when music data that has been distributed through an electronic music distribution system is recorded on an MD, the playback apparatus is required to decode the music data on the MD according to the adopted encryption method. As a result, the playback apparatus is bulky, expensive, and not useful for users.

It is useful for users when music data that has been distributed through an electronic music distribution system is decoded at the time of recording on an MD since playback apparatuses can be inexpensive.

In this case, however, unauthorized duplication of music data is encouraged, so that the copyright of music data cannot be fully protected.

SUMMARY OF THE INVENTION

It is accordingly an object of the present invention to provide a digital data recording apparatus, a digital data recording method, and a computer-readable recording medium for protecting copyrights and reproducing music data recorded on a recording medium with an inexpensive digital data playback apparatus.

The above-mentioned object may be achieved by a digital data recording apparatus for recording digital data on a recording medium that may include: a communication unit for receiving encrypted digital data via a digital network; a decryption unit for decrypting the encrypted digital data that has been received by the communication unit; an encryption unit including a plurality of encryption sub-units that re-encrypt decrypted digital data in encryption systems having different security levels; a recording unit for recording digital data that has been re-encrypted by the encryption unit on the recording medium; and a controller for controlling the decryption unit and the encryption unit, wherein the controller has one of the plurality of encryption sub-units re-encrypt the digital data that has been decrypted by the decryption unit.

As a result, it is possible to record digital data that has been re-encrypted by the encryption unit and can be easily reproduced by the playback apparatus. It is also possible to protect the copyright since the digital data has been re-encrypted.

The above-mentioned object may be also achieved by the digital data recording apparatus, wherein the digital data that has been recorded on the recording medium is reproduced by a playback apparatus, the encryption unit includes: a first encryption sub-unit for re-encrypting digital data using an encryption key that has been created according to identification information of the recording medium; and a second encryption sub-unit for re-encrypting digital data using an encryption key that has been created according to identification information of the playback apparatus; and the controller judges whether the recording medium is removable from the playback apparatus, has the first encryption sub-unit re-encrypt the decrypted digital data when the recording medium is removable from the playback apparatus, and has the second encryption sub-unit re-encrypt the decrypted digital data when the recording medium is not removable from the playback apparatus.

As a result, when digital data on a recording medium is reproduced by a playback apparatus, the digital data may be reproduced by re-encrypting the digital data using an encryption key that has been created according to the identification information of the recording medium. On the other hand, when digital data on a recording medium is reproduced by a specific playback apparatus, the digital data may be reproduced by the specific playback apparatus by re-encrypting the digital data using an encryption key that has been created according to the identification information of the specific playback apparatus.

The above-mentioned object may be also achieved by the digital data recording apparatus that may include an accounting unit for conducting an accounting process via the digital network, wherein the controller determines an accounting value according to an encryption sub-unit that has re-encrypted the decrypted digital data, and controls the accounting unit so that the controller conducts the accounting process according to the determined accounting value.

As a result, it is possible to select one of the plurality of encryption sub-units that re-encrypt digital data in encryption systems having different security levels and to pay a charge according to the selected encryption sub-unit.

The above-mentioned object may be also achieved by the digital data recording apparatus, wherein the controller prohibits the decryption unit from decrypting the encrypted digital data when the encryption unit fails to create any encryption key.

As a result, unnecessary decryption of digital data may be prevented when the encryption unit fails to create any encryption key.

The above-mentioned object may be also achieved by the digital data recording apparatus, wherein the security levels of the encryption systems in which the plurality of encryption sub-units re-encrypt decrypted digital data are lower than security levels of encryption systems in which encrypted digital data that are to be received by the communication unit have been encrypted.

As a result, a playback apparatus may easily reproduce digital data, leading to a less expensive playback apparatus.

The above-mentioned object may be also achieved by the digital data recording apparatus, wherein the encrypted digital data that is received by the communication unit has been encrypted in one of encryption systems having different security levels and includes attribute information that indicates the encryption system, the decryption unit includes a plurality of decryption sub-units that decrypt encrypted digital data that have been encrypted in the encryption systems, and the controller judges the encryption system in which the encrypted digital data has been encrypted according to the attribute information, and controls the decryption unit so that one of the plurality of decryption sub-units corresponding to the judged encryption system decrypts the encrypted digital data.

As a result, even when received digital data have been encrypted in encryption systems having different security levels, it is possible to decrypt digital data by selecting a decryption sub-unit according to the encryption system in which the digital data has been encrypted.

The above-mentioned object may be also achieved by the digital data recording apparatus that may further include an accounting unit for conducting an accounting process via the digital network, wherein the controller determines an accounting value according to a decryption sub-unit that has decrypted the encrypted digital data and an encryption sub-unit that has re-encrypted the decrypted digital data, and controls the accounting unit so that the controller conducts the accounting process according to the determined accounting value.

As a result, it is possible to pay a charge according to the decryption and re-encryption of digital data and to protect the copyright.

The above-mentioned object may be also achieved by a digital data recording method of recording digital data on a recording medium, the digital data recording method may include: a communication step for receiving encrypted digital data via a digital network; a decryption step for decrypting the encrypted digital data that has been received at the communication step; an encryption step for re-encrypting decrypted digital data in one of a plurality of encryption systems having different security levels; and a recording step for recording digital data that has been re-encrypted at the encryption step on the recording medium.

As a result, it is possible to record digital data on a recording medium that has been re-encrypted in an encryption system so that the digital data is easily reproduced by a playback apparatus. In addition, since the digital data is re-encrypted, the copyright may be protected.

The above-mentioned object may be also achieved by the digital data recording method, wherein the encrypted digital data that is received at the communication step has been encrypted in one of encryption systems having different security levels and includes attribute information that indicates the encryption system, the digital data recording method, further comprising a judging step for judging one of the plurality of encryption systems according to the attribute information, wherein the decryption step decrypts the encrypted digital data according to the judgement at the judging step.

As a result, digital data that has been recorded on a recording medium may be reproduced by any playback apparatus or only by a specific playback apparatus.

The above-mentioned object may be also achieved by a computer-readable recording medium that is applied to a digital data recording apparatus for recording digital data on a first recording medium, the computer-readable recording medium storing a program that has a computer execute steps: a communication step for receiving encrypted digital data via a digital network; a decryption step for decrypting the encrypted digital data that has been received at the communication step; an encryption step for re-encrypting decrypted digital data in one of a plurality of encryption systems having different security levels; and a recording step for recording digital data that has been re-encrypted at the encryption step on the recording medium.

As a result, it is possible to record digital data on a recording medium that has been re-encrypted in an encryption system so that the digital data is easily reproduced by a playback apparatus. In addition, it is possible to protect copyrights by using the recording medium in a digital data recording apparatus that has no function to protect copyrights.

The above-mentioned object may be also achieved by the computer-readable recording medium, wherein the encrypted digital data that is received at the communication step has been encrypted in one of encryption systems having different security levels and includes attribute information that indicates the encryption system, the digital data recording method may further include a judging step for judging one of the plurality of encryption systems according to the attribute information, wherein the decryption step decrypts the encrypted digital data according to the judgement at the judging step.

As a result, it is possible to reproduce digital data that has been recorded on the first recording medium by any playback apparatus or by a specific apparatus.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 2 is an external view of the hardware configuration of the first embodiment of the present invention and an external view of a playback apparatus of a recording medium according to the first embodiment of the present invention;

FIG. 3 shows an example of a display screen of a home page for purchasing music data according to the first embodiment of the present invention;

FIG. 5 shows an example of a display screen of a home page for purchasing music data according to the first embodiment of the present invention;

FIG. 9 is an example of information that is displayed on a display unit when digital signals provided by the information provider are recorded in the second embodiment;

FIG. 12 shows the attribute information of data in the third embodiment;

FIG. 17 is an example of attribute information;

FIG. 18 shows an example of management information;

FIG. 23 shows an example of the data structure of attribute information that is attached to digital data when transmitted in seventh embodiment;

FIG. 24 is a flowchart showing operations in seventh embodiment;

FIG. 25 shows an example of the data structure of attribute information that is attached to digital data when transmitted in another example of seventh embodiment.

DESCRIPTION OF THE PREFERRED EMBODIMENTS

An explanation of the preferred embodiments of a digital data recording apparatus according to the present invention will be given with reference to figures.

The First Embodiment

Figure 1:
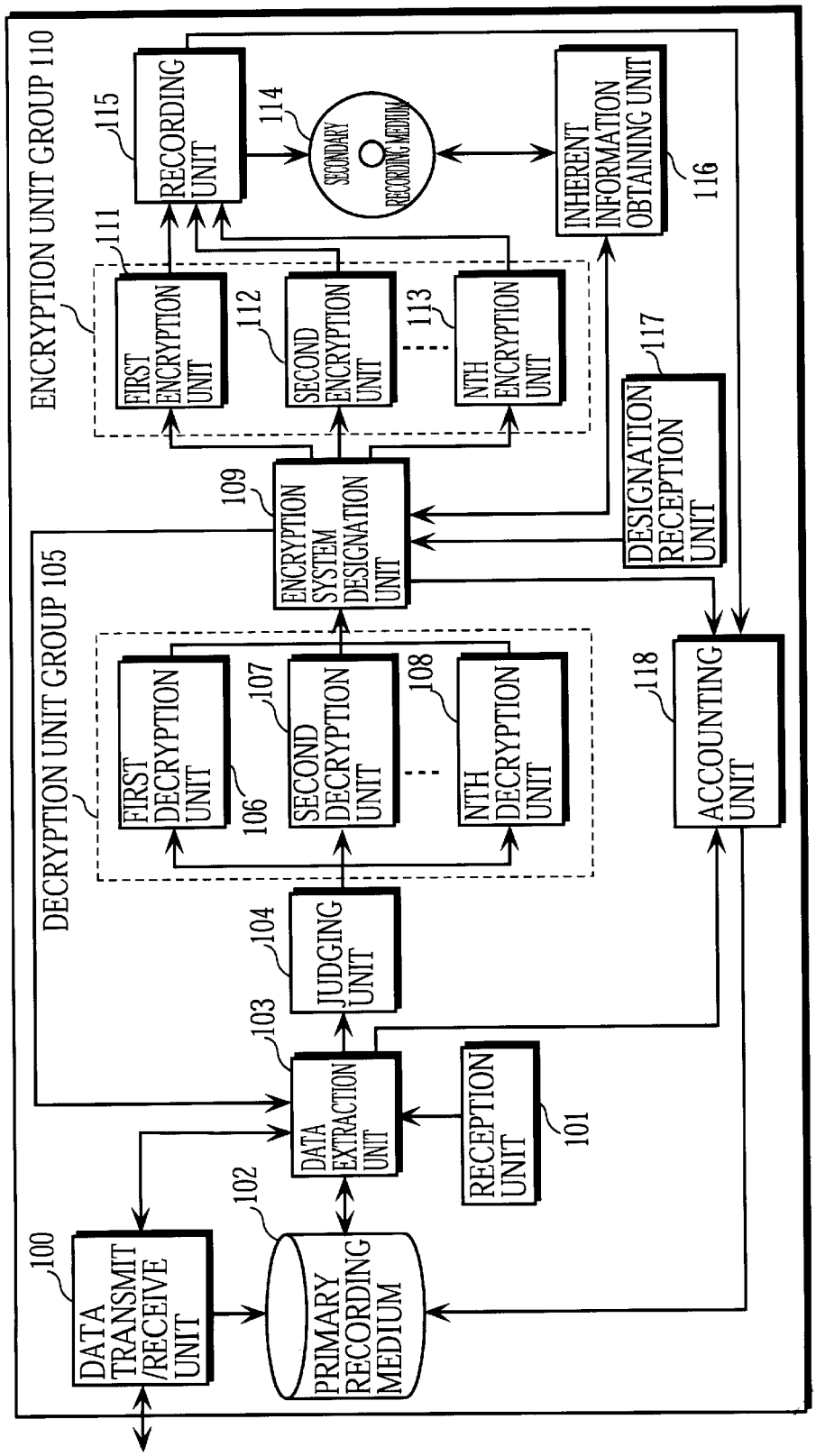
FIG. 1 shows the structure of a digital data recording apparatus according to the first embodiment of the present invention.

FIG. 1 shows the structure of a digital data recording apparatus according to the first embodiment of the present invention. The digital data recording apparatus includes a data transmit/receive unit 100, a reception unit 101, a primary recording medium 102, a data extraction unit 103, a judging unit 104, a decryption unit group 105, a encryption system designation unit 109, an encryption unit group 110, a secondary recording medium 114, a recording unit 115, an inherent information obtaining unit 116, a designation reception unit 117, and an accounting unit 118.

Note that each element of the digital data recoding apparatus apart from the secondary recording medium 114 and the recording unit 115 is generally realized by a PC (Personal Computer) 201 as shown in FIG. 2. The recording unit 115 is realized by, for instance, a DVD (Digital Versatile Disc)-RAM drive 202, ant the secondary recording medium 114 is realized by a DVD-RAM disc 203.

The digital data recording apparatus receives music data, i.e., encrypted digital data that is distributed through the Internet, and downloads the received music data on the primary recording medium 102. Then the digital data recording apparatus decodes the digital data in the decryption unit group 105, re-encrypts the decoded digital data in the encryption unit group 110, and records the re-encrypted digital data in the secondary recording medium.

Note that although an explanation of electronic music distribution will be given in the present embodiment, the kind of distributed digital data is not limited to music. Distributed digital data may be video data, character data, or the combination of those kinds of data.

The data transmit/receive unit 100 is a communication unit realized by a modem and a control software, and is connected to the host computer (not illustrated) of the information provider through a telephone line. When informed of the purchase requirement of a piece of music that has been received by the reception unit 101 via the data extraction unit 103, the data transmit/receive unit 100 transmits the purchase requirement to the host computer. The data transmit/receive unit 100 downloads music data from the host computer according to the purchase requirement via the Internet and records the downloaded music data on the primary recording medium. Meanwhile, the data transmit/receive unit 100 transmits accounting information to the host computer that has been generated at the time of the purchase of music.

Here, an explanation of information provided by the information provider will be given. The information provider sets up a site, i.e., a homepage for the sale of music data to provide information such as music titles and prices that are necessary for users to purchase music data and may arouse the interest of users. Users purchase desired music data according to the information provided by the information provider.

FIG. 3 shows an example of homepage for the sale of music data provided by an information provider. The information includes titles 301, singers 302, times 303, and prices 304. A title 301 and a singer 302 show the title and singer of one piece of music data. A time 303 shows the time required to record (play back) one piece of music data, and a price 304 shows the selling price of one piece of music data. A user selects a piece of music according to the information and informs the data transmit/receive unit 100 of purchase requirement through the reception unit 101. Needless to say, the information provided by the information provider is not limited to character information as shown in FIG. 3. The information may be images such as jacket pictures and music data for test-listening.

The reception unit 101 includes a keyboard and a mouse, and receives purchase requirement from the user who has watched the information shown in FIG. 3 on the display screen of the PC. The received purchase requirement is transferred to the data transmit/receive unit 100 via the data extraction unit 103.

The primary recording medium 102 is realized by a hard disk in the PC, and stores the music data, i.e., the encrypted digital data that has been received by the data transmit/receive unit 100. Meanwhile, in a secure area on the primary recording medium 102, encrypted accounting information, for instance, is recorded by the accounting unit 118 when the downloaded music data is recorded on the secondary recording medium 114.

Figure 4:
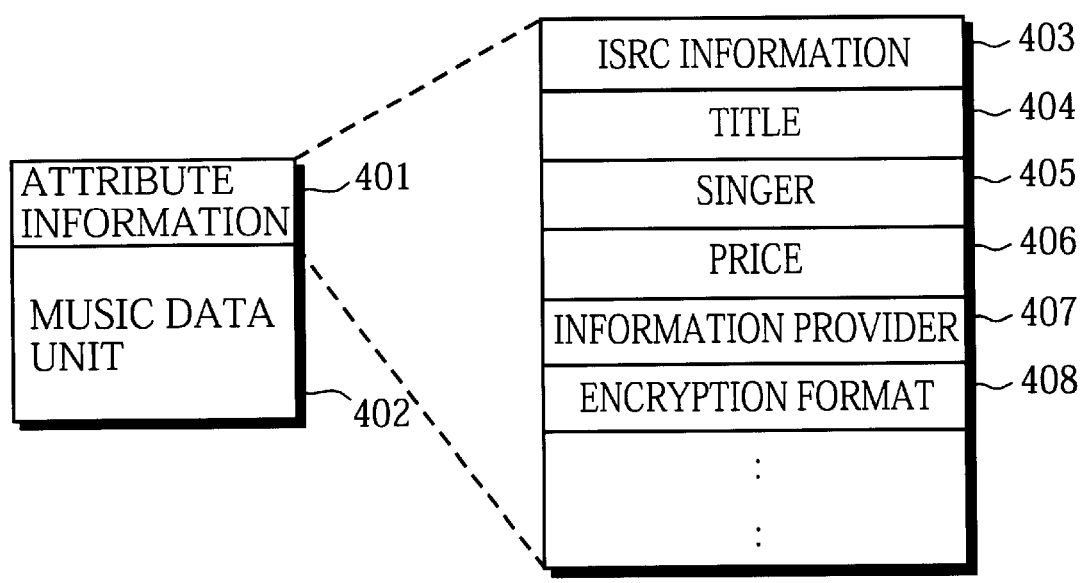
FIG. 4 shows an example of data structure of music data downloaded on a primary recording medium according to the first embodiment of the present invention.

FIG. 4 shows an example of the data structure of downloaded music data stored in the primary recording medium 102, i.e., music data that the information provider provides. Music data provided by the information provider mainly composed of attribute information 401 including the title, singer, and price of the music data and a music data unit 402 that is the music data itself.

The attribute information 402 includes ISRC (International Standard Recording Code) information 403, a title 404, a singer 405, a price 406, an information provider 407, and an encryption format 408. An explanation of the attribute information 401 will be given below.

The ISRC information 403 is specific information assigned to each piece of music data, and is composed of a country code (two ASCII (American Standard Cord for International Interchange) characters), an owner code (three ASCII characters), a recording year (two-digit numbers), and a serial number (five-digit numbers). The title 404 is character information showing the title of the music data and the singer 405 is character information showing the singer of the music data. The price 406 is information showing the data of the music data. Note that the price 406 shows the amount that is charged when the downloaded music data is recorded on the secondary recording medium 114 using the digital data recording apparatus in the present embodiment.

The information provider 407 is information showing the provider or the copyrighter of the music data, i.e., shows the recipient of the amount charged when the user records the music data using the digital data recording apparatus.

The encryption format 408 is information showing the encryption format in which the downloaded music data has been encrypted because the encryption format of music data depends on the information provider. For instance, when information providers A, B, and C provide music data, music data provided by the information provider A is encrypted in a format A, music data provided by the information provider B is encrypted in a format B, and music data provided by the information provider is encrypted in a format C. Note that the main object of the invention in the present embodiment is to convert data on the secondary recording medium 114 according to an encryption format that is easily decoded by a playback apparatus and to protect the copyright when information provided by information providers are encrypted in a variety of formats. As a result, a detailed explanation of the algorithm of encryption will not given here.

In the attribute information 401, the price 406 and the information provider 407 are encrypted as necessary since the tampering of the price 406 and the information provider 407 can lead to a loss to the information provider.

When receiving an instruction from the encryption system designation unit 109 to extract digital data, the data extraction unit 103 extracts the attribute information 401 from the primary recording medium 102 and informs the accounting unit 118 of the attribute information 401. Meanwhile, the data extraction unit 103 informs the judging unit 104 of information in the encryption format 408. Note that when the price 406 is encrypted in the attribute information 401, the data extraction unit 103 informs the accounting unit 118 of the price 406 after the decoding by the decryption unit group 105. Then, the data extraction unit 103 extracts the music data unit 402 from the primary recording medium 102, and outputs the extracted music data unit 402 to the judging unit 104. As has been described, the data extracted by the data extraction unit 103 has been encrypted in an encryption system specific to the information provider.

The judging unit 104 judges to which decryption unit the music data is to be output according to the information of the encryption format 408 that has been informed of by the data extraction unit 103.

The decryption unit group 105 includes "n" decryption units. A first decryption unit 106 decodes digital data that has been encrypted in the format A, a second decryption unit 107 decodes digital data that has been encrypted in the format B, and an "n"th decryption unit 108 decodes digital data that has been encrypted in the format N. Each of the first, second, and nth decryption units 106, 107, and 108 is composed of the decode module of a different information provider.

For instance, when the information of the encryption format 408 indicates the format B, the judging unit 104 outputs the digital data in the music data unit 402 in the music data to the second decryption unit 107. The second decryption unit 107 decodes the input digital data and outputs the decoded digital data to the encryption system-designation unit 109.

When a decryption key is necessary to decrypt encrypted data by one of the first, second, and nth decryption units 106, 107, and 108, the data transmit/receive unit 100 obtains a decryption key according to the encryption system of the data to decrypt the data. The first, second, and nth decryption units 106, 107, and 108 once decrypt data that has been encrypted in a different encryption system according to the information provider.

When having received the designation of the kind of encryption system from the designation reception unit 117, the encryption system designation unit 109 instructs the inherent information obtaining unit 116 to obtain inherent information according to the designation. When notified of the inherent information by the inherent information obtaining unit 116, the encryption system designation unit 109 instructs the data extraction unit 103 to extract music data. When notified that the inherent information according to the designation cannot be obtained by the inherent information obtaining unit 116, the encryption system designation unit 109 shows that the designated encryption system cannot be used to re-encrypt data on the display unit (not illustrated). Meanwhile, when not having received the designation of the kind of encryption system from the designation reception unit 117, the encryption system designation unit 109 instructs the inherent information obtaining unit 116 to obtain inherent information according to the attribute of the secondary recording medium 114. When receiving the notification concerning the obtainment of the inherent information from the inherent information obtaining unit 116, the encryption system designation unit 109 instructs the data extraction unit 103 to extract music data. When notified that the inherent information cannot be obtained, the encryption system designation unit 109 generates random numbers.

When having received the designation of the kind of encryption system from the designation reception unit 117, the encryption system designation unit 109 selects one encryption unit according to the designation. When receiving the input of decrypted digital data from one of the first, second, nth decryption units 106, 107, and 108, the encryption system designation unit 109 notifies the selected encryption unit of the decrypted digital data along with the inherent information that has been informed of by the inherent information obtaining unit 116.

When not having received the designation of the kind of encryption system from the designation reception unit 117, the encryption system designation unit 109 selects one encryption unit according to the kind of the inherent information that has been informed of by the inherent information obtaining unit 116. When receiving the input of decrypted digital data from one of the first, second, nth decryption units 106, 107, and 108, the encryption system designation unit 109 notifies the selected encryption unit of the digital data along with the inherent information. Meanwhile, when having received the notification that the inherent information cannot be obtained from the inherent information obtaining unit 116, the encryption system designation unit 109 notifies one of the encryption units of the digital data along with generated random numbers.

The encryption unit group 110 includes "n" encryption units, a first, second, . . . , "n"th encryption units 111, 112, . . . , 113. Each of the encryption units 111, 112, . . . , 113 re-encrypts informed digital data with a different encryption key. More specifically, the first encryption unit 111 re-encrypts data with an encryption key that is created according to the identification information inherent in the secondary recording medium 114. The second encryption unit 112 re-encrypts data with an encryption key that is created according to the identification information inherent in a playback apparatus for playing back the secondary recording medium 114 (not illustrated). The nth encryption unit 113 re-encrypts data with an encryption key that is created according to random numbers. Each of the data size of the encryption keys is set smaller than the data size of the encryption key of encrypted digital data that is recorded on the primary recording medium 102.

When the data size of the encryption key of re-encrypted digital data that is to be recorded on the secondary recording medium recording medium 114 is relatively small, the digital data is decrypted relatively easily. As a result, the structure necessary to decrypt the digital data of a playback apparatus for playing back the digital data is simple, leading to reduce the cost of the playback apparatus.

For instance, when having received no instruction from the designation reception unit 117 and having been informed of the identification information of the secondary recording medium 114 from the inherent information obtaining unit 116, the encryption system designation unit 109 informs the first encryption unit 111 of the identification information of the secondary recording medium 114. The first encryption unit 111 creates an encryption key according to the informed identification information, rewrites the encryption format 408 of the attribute information 401 of the music data that has been informed of by the encryption system designation unit 109, and re-encrypts the music data unit 402 using the created encryption key. The first encryption unit 111 informs the recording unit 115 of the re-encrypted digital data.

When having received the instruction to re-encrypt data using the inherent information of a playback apparatus for playing back the secondary recording medium 114 (not illustrated) from the designation reception unit 117, the encryption system designation unit 109 instructs the inherent information obtaining unit 116 to obtain the identification information inherent in the playback apparatus. When informed of the identification information inherent in the playback apparatus from the inherent information obtaining unit 116, the encryption system designation unit 109 informs the second encryption unit 112 of the informed identification information and the decrypted digital data that has been informed of from the decryption unit group 105.

The second encryption unit 112 creates an encryption key according to the identification information that has been transferred from the encryption system designation unit 109, re-encrypts the digital data with the created encryption key, and informs the recording unit 115 of the re-encrypted digital data. As in the case of not having received the instruction from the designation reception unit 117, the content of the encryption format 408 in the attribute information 401 is rewritten.

The secondary recording medium 114 is composed of a DVD-RAM disc (shown in FIG. 2), an MD, and a small-scale semiconductor memory that is removable or nonremovable according to the model of a playback apparatus (not illustrated) and the like. Music data that has been re-encrypted by the encryption unit group 110 is recorded on the secondary recording medium 114 by the recording unit 115. For instance, when digital data has been recorded on the DVD-RAM disc 203, the DVD-RAM disc 203 is inserted into the DVD-Audio player 204 to play music as shown in FIG. 2.

The recording unit 115 is realized by, for instance, the DVD-RAM drive 202 shown in FIG. 2. The recording unit 115 records digital data that has been transferred from the encryption unit group 110 on the secondary recording medium 114. When completing recording, the recording unit 115 informs the accounting unit 118 of the completion.

When having instructed to obtain the identification information inherent in the secondary recording medium 114 by the encryption system designation unit 109, the inherent information obtaining unit 116 reads the information written in the BCA (Burst Cutting Area) and informs the encryption system designation unit 109 of the read information when the secondary recording medium 114 is a DVD-RAM, for instance. Note that each secondary recording medium 114 has a different piece of inherent identification information that has been recorded at the time of manufacturing, so that the identification information cannot be read or rewritten by ordinary user operation.

An encryption key is created according to the identification information, and digital data re-encrypted with the encryption key is recorded on a DVD-RAM disc. As a result, even if a user with a malicious intent makes a copy of the content of the DVD-RAM disc on another recording medium using a tool for bit copy and tries to play back the copied data on other recording medium, the copied data cannot be normally decrypted since the information for decryption key of the other recording medium is different from that of the DVD-RAM disc. In this way, the copyright of the music data is fully protected.

Meanwhile, when having been instructed to obtain the identification information inherent in the playback apparatus (not illustrated) in which the secondary recording medium 114 is put by the encryption system designation unit 109, the inherent information obtaining unit 116 reads the identification information of the playback apparatus and informs the encryption system designation unit 109 of the read identification information. Each playback apparatus also has a different piece of inherent identification information that has been assigned at the time of manufacturing, so that the identification information cannot be read or rewritten by an ordinary user operation. As a result, when data is re-encrypted according to identification information, the re-encrypted data can be played back only by a peculiar playback apparatus.

Note that when the inherent information obtaining unit 116 cannot obtain the inherent identification information that has been designated by the encryption system designation unit 109, i.e., when no identification information is assigned to the secondary recording medium 114 and the playback apparatus, the inherent information obtaining unit 116 informs the encryption system designation unit 109 that the designated inherent identification information cannot be obtained.

When receiving the instruction to obtain inherent identification information without the instruction of the kind of the inherent identification information, the inherent information obtaining unit 116 judges whether the secondary recording medium 114 is a recording medium removable from the playback apparatus such as a DVD-RAM disc or a recording medium that is built in the playback apparatus such as a small-scale semiconductive memory. When the secondary recording medium 114 is a removable one, the inherent information obtaining unit 116 reads the inherent identification information of the secondary recording medium 114, and informs the encryption system designation unit 109 of the read inherent identification information. Meanwhile, when the secondary recording medium 114 is a nonremovable one, the inherent information obtaining unit 116 reads the inherent identification information of the playback apparatus, and informs the encryption system designation unit 109 of the read inherent identification information. When no identification information can be obtained, the inherent information obtaining unit 116 informs the encryption system designation unit 109 that no identification information can be obtained.

The designation reception unit 117 is realized by the keyboard and the mouse of the PC. The designation reception unit 117 receives the instruction of the kind of encryption system from the user, and informs the encryption system designation unit 109 of the encryption system kind.

While the homepage information in FIG. 3 shows only one type of price, the homepage information in FIG. 5 shows two types of price, i.e., a price (1). 501 and a price (2) 502.

While the price (1) 501 shows the price when digital data is re-encrypted at the time of recording; according to the identification information inherent in the secondary recording medium 114, the price (2) 502 shows the price when digital data is re-encrypted at the time of recording according to the identification information inherent in the playback apparatus for playing back the secondary recording medium 114. Note that each of the prices (1) 501 and (2) 502 is freely set by the information provider.

The user instructs the encryption of digital data in a desired encryption format in reference to the music and price information shown in FIG. 5 according to the usage pattern of the secondary recording medium 114 using the designation reception unit 117. For instance, when digital data is to be played back in a specific playback apparatus, i.e., when the secondary recording medium 114 is not played back in other playback apparatuses, the user instructs to re-encrypt the digital data according to the identification information inherent in the specific playback apparatus. As shown by the price (2) in FIG. 5, prices are generally cheap when data is re-encrypted according to the identification information of playback apparatus. This is because the degree of freedom is low compared with the encryption according to the identification information inherent in the secondary recording medium 114 since re-encrypted data is not played back in other playback apparatuses. When digital data is to be played back with any playback apparatus, the user instructs to re-encrypt the digital data according to the identification information inherent in the secondary recording medium 114.

Note that although the designation reception unit 117 is integral with the reception unit 101, the designation reception unit 117 and the reception unit 101 are described as separate elements for convenience in explanation.

The accounting unit 118 receives the notification of the attribute information 401 of music data from the data extraction unit 103 and stores the received attribute information 401. When notified that re-encrypted digital data is recorded on the secondary recording medium 114 by the recording unit 115, the accounting unit 118 refers to the price 406 in the attribute information 401 to determine the amount of charge and writes the determined amount of charge along with the attribute information 401 in a secure area on the primary recording medium 102 as the accounting information.

Note that when the price 406 includes the prices (1) 501 and (2) 502 as shown in FIG. 5, the amount of charge is determined according to one of the first to nth encryption units 111 to 113 that has been transferred to the accounting unit 118 as the used encryption unit from the encryption system designation unit 109.

Figure 6:
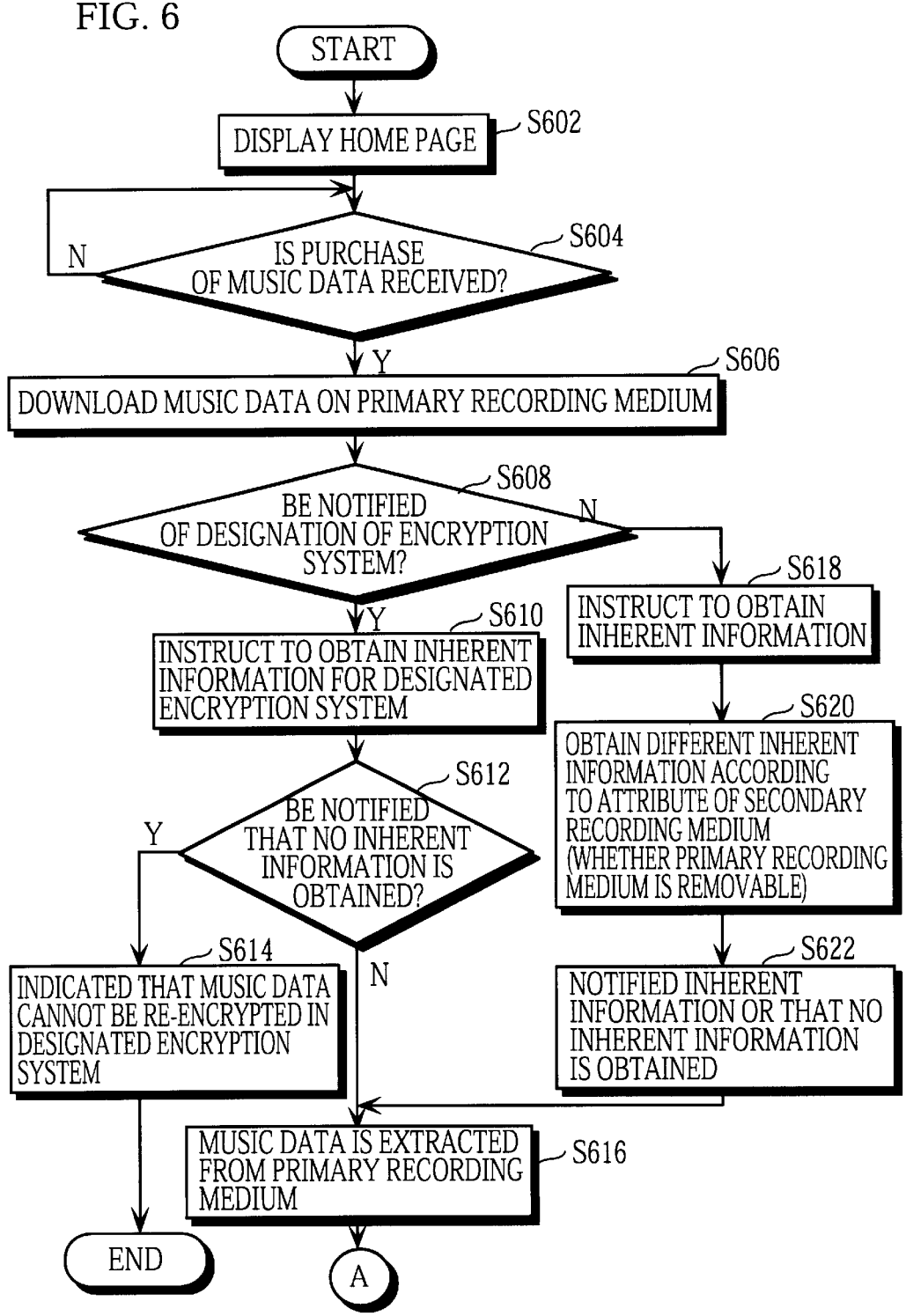
FIG. 6 is a first flowchart illustrating the operations in the first embodiment of the present invention.
Figure 7:
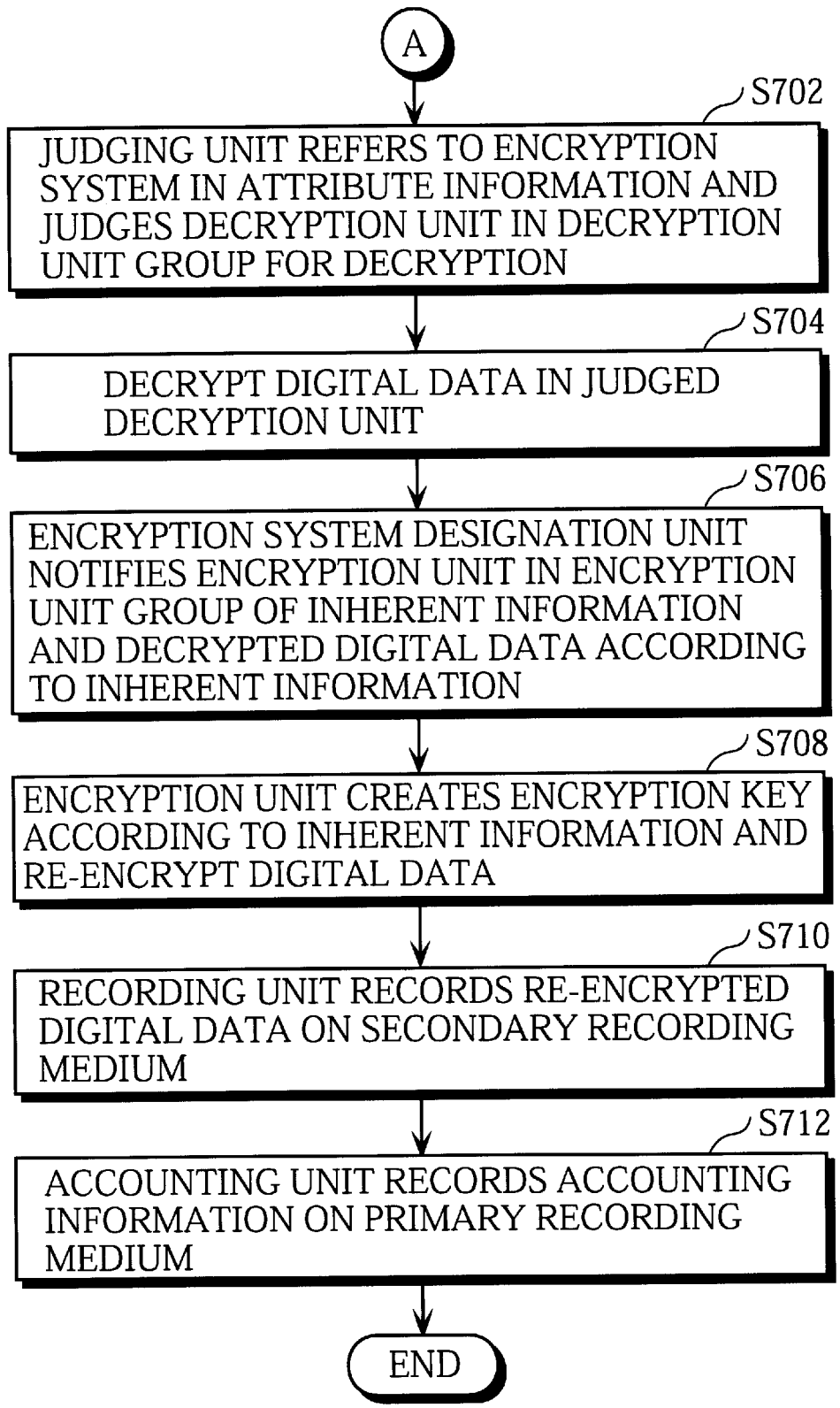
FIG. 7 is a second flowchart illustrating the operations in the first embodiment of the present invention.

Here, an explanation of the operations in the present embodiment will be given with reference to the flowcharts in FIGS. 6 and 7.

The reception unit 101 receives home page requirement from the user, the data transmit/receive unit 100 accesses to a homepage provided by an information provider of music data, and the data extraction unit 103 displays a homepage (refer to FIGS. 3 and 5) on the display unit (not illustrated) (step s602).

The data extraction unit 103 awaits instruction to purchase music data designated by the user from the reception unit 101 and instructs the data transmit/receive unit 100 to receive the designated music data (step s604). When receiving the music data, the data transmit/receive unit 100 downloads the received music data on the primary recording medium 102 (s606).

Watching the homepage display, the user inputs the kind of encryption system according to the usage pattern of the secondary recording medium 114 using the designation reception unit 117.

The encryption system designation unit 109 judges whether the designation reception unit 117 has informed the encryption system designation unit 109 of the designation of the kind of encryption system (step s608). When having been informed of the designation of the kind of encryption system, the encryption system designation unit 109 instructs the inherent information obtaining unit 116 to obtain the inherent information that is to be used for the encryption system of the designated kind (step s610). The encryption system designation unit 109 judges whether the inherent information obtaining unit 116 has informed that the inherent information cannot be obtained (step s612). When informed that the inherent information cannot be obtained, the encryption system designation unit 109 has the display unit (not illustrated) display that the music data cannot be re-encrypted according to the encryption system of the designated kind (step s614) to complete the processing. Meanwhile, when informed of the inherent information for the designated kind of encryption system, the encryption system designation unit 109 instructs the data extraction unit 103 to extract the digital data.

The data extraction unit extracts the music data recorded on the primary recording medium 102 (step s616).

At step s608, when judging that the designation reception unit 117 has not informed the encryption system designation unit 109 of the designation of the kind of encryption system, the encryption system designation unit 109 instructs the inherent information obtaining unit 116 to obtain inherent information without designating the kind of the inherent information (step s618).

The inherent information obtaining unit 116 judges the attribute of the secondary recording medium 114, i.e., judges whether the secondary recording medium 114 in the playback apparatus (not illustrated) is a removable one. When the secondary recoding medium 114 is a removable one, the inherent information obtaining unit 116 obtains the identification information of the secondary recording medium 114, and when the secondary recoding medium 114 is a nonremovable one, the inherent information obtaining unit 116 obtains the identification information of the playback apparatus (step s620).

When informed of the inherent (identification) information by the inherent information obtaining unit 116, or when informed that inherent information has not been obtained (step s622), the encryption system designation unit 109 instructs the data extraction unit 103 to extract the digital data. The processing advances to step s616.

Then, the judging unit 104 refers to the encryption format 408 in the attribute information 401 of the music data that has been extracted by the data extraction unit 103 and judges which one of the first to nth decryption units 106 to 108 in the decryption unit group 105 decrypts the music data (step s702).

One of the first to nth decryption units 106 to 108 that has been judged by the judging unit 104 decrypts the digital data that has been input via the judging unit 104 and outputs the decrypted digital data to the encryption system designation unit 109 (step s704).

The encryption system designation unit 109 selects one of the first to nth encryption units 111 to 113 in the encryption unit group 110 according to the inherent information that has been transferred from the inherent information obtaining unit 116 (including the information that inherent information cannot be obtained), and informs the selected encryption unit of the inherent information (generated random numbers in the case of the information that inherent information cannot be obtained) and the decrypted digital data (step s706).

The informed encryption unit creates an encryption key according to the inherent (identification) information (according to the random numbers in the case of the information of the random numbers) and re-encrypts the digital data using the created encryption key. At this time, the content of the encryption format 408 is rewritten in the attribute information 401 (step s708).

The recording unit 115 records the digital data on the secondary recording medium 114 that has been transferred from one of the first to nth encryption units 111 to 113 (step s710). When completing the recording, the recording unit 115 informs the accounting unit 118 of the recording completion.

When receiving the information from the recording unit 115, the accounting unit 118 determines the amount of charge according to the price 406 and the like that has been transferred from the data extraction unit 103 and records the amount of charge on the primary recording medium 102 (step s712) to complete the processing.

In the present embodiment, the decryption unit group 105 are composed of the decryption modules (the first to nth decryption units 106 to 108) for different information providers. The decryption unit group may includes different decryption units according to the quality of music data, for instances, for digital data in 24 bits of LPCM (Liner Pulse Code Modulation), MP3 (Moving Picture Experts Group 1 Audio Layer 3) and the like. More specifically, while high quality 24 bits of LPCM may be set as encrypted digital data that is difficult to decrypt, normal MP3 may be set as encrypted digital data that is not so difficult to decrypt, and the first decryption unit 106 may decrypt digital data in 24 bits of LPCM and the second decryption unit 107 may decrypt digital data in MP3.

In the present embodiment, the encryption unit group 110 includes the first to nth encryption units 111 to 113 for different kinds of inherent information. The encryption units may correspond to the quality of music data. More specifically, digital data that has been decrypted by the first decryption unit 106 may be re-encrypted by the first encryption unit 111, digital data that has been decrypted by the second decryption unit 107 may be re-encrypted by the second encryption unit 112, and digital data that has been decrypted by the nth decryption unit 108 may be re-encrypted by the nth encryption unit 113. In this case, the data size of the encryption key used for encryption in the first encryption unit 111 is larger than that of the encryption key used in the second encryption unit 112, and that of the encryption key used in the second encryption unit 112 is larger than that of the encryption key used in the nth encryption unit 113. The accounting unit determines the accounting amount of digital data according to the decryption unit that has decrypted the digital data and the encryption unit that has re-encrypted the digital data. As a result, the higher the quality of digital data, the more surely the copyright is protected. In this case, information provider may set higher price for music data with higher quality.

The digital data recording apparatus according to the present embodiment has the structure shown in FIG. 1. It is possible to record a program on a computer-readable recording medium such as a floppy disk that has a computer realize the functions of the elements of the digital data recording apparatus, and to protect copyrights by applying the computer readable recording medium to a digital data recording apparatus that has no function of protecting copyrights.

In the present embodiment, digital data is downloaded from the host computer when the user requires the purchase of the digital data. It is possible to temporarily record music data or only the attribute information on the primary recording medium in the PC of the user regardless of the purchase, and to purchase digital data that has been recorded on the primary recording medium 102.

While the attribute information 401 and the music data unit 402 are separately described in the present embodiment, the attribute information 401 may be embed in the digital data in the music data 402 using Water Mark (electronic watermark) technology.

In the present embodiment, the data input and output between the decryption unit group 105 and the encryption unit group 110 via the encryption system designation unit 109 has not been referred to in particular. It is possible to prevent the leakage of decrypted data for security by transmitting data after authentification or by realizing the decryption unit group 105, the encryption system designation unit 109, and the encryption unit group 110 with one chip.

In addition, while accounting information is recorded in a secure area on the primary recording medium 102 in the present embodiment, accounting information may be recorded on another recording medium such as an IC card.

No explanation of the timing of accounting has been given in the present embodiment. It is possible to suppose that the modem is connected to the host computer when digital data is recorded on the secondary recording medium 114, to suppose that the modem is automatically connected to the host computer when the amount of charge reaches to a set amount, or to suppose that the modem is connected to the host computer when a set period of time has elapsed since the recording of accounting information.

In addition, while only audio information is provided by the information provider in the present embodiment, video information, audio information, character information, the combination of video information, audio information, and character information, and the like may be provided.

The Second Embodiment

Figure 8:
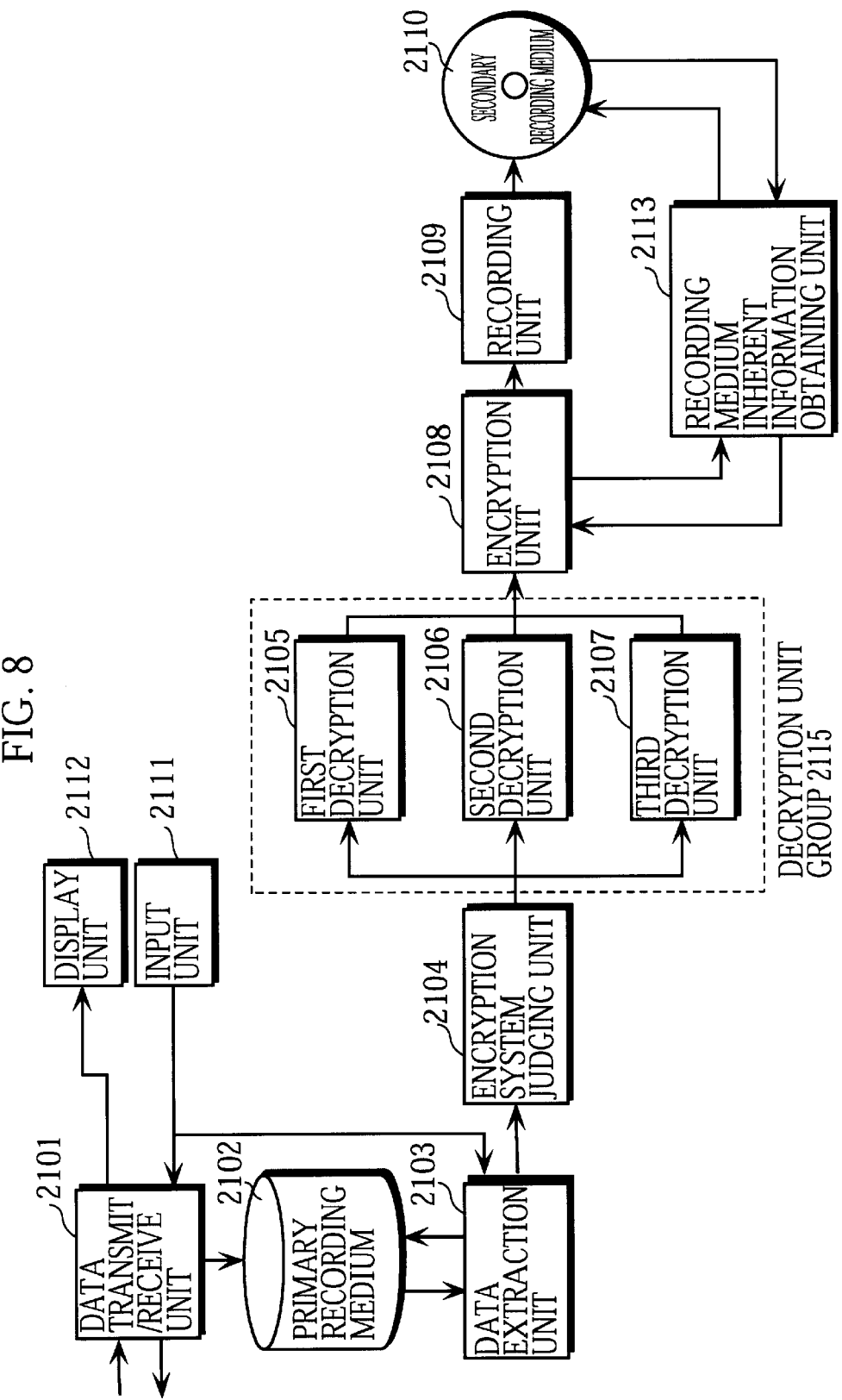
FIG. 8 shows the structure of a digital data recording apparatus according to the second embodiment of the present invention.

FIG. 8 shows the structure of a digital data recording apparatus according to the second embodiment of the present invention. The digital data recording apparatus is generally realized by a personal computer. The digital data recording apparatus includes a data transmit/receive unit 2101, a primary recording medium 2102, a data extraction unit 2103, an encryption system judging unit 2104, a first decryption unit 2105, a second decryption unit 2106, a third decryption unit 2107, an encryption unit 2108, a recording unit 2109, a secondary recording medium 2110, an input unit 2111, a display unit 2112, and a recording medium inherent information obtaining unit 2113. While a decryption unit group 2115 is composed of the first, second, third decryption units 2105, 2106, and 2107, the number of decryption units is not limited to three. The decryption unit group 2115 is composed of a plurality of decryption units.

Note that data to be recorded are music data that are distributed through the Internet is in the present embodiment. The music data are supposed to be encrypted in different encryption systems according to the providers.

An information provider provides music data and information including music titles, prices, copy control information, and the like (referred to "attribute information" in this specification) that are necessary at the time of purchase and may arouse the interest of users together or separately. In the present embodiment, attribute information and music data are supposed to be separately provided.

The data transmit/receive unit 2101 is a communication unit realized by a modem and is connected to the host computer (not illustrated) of the information provider through a telephone line. The attribute information that the data transmit/receive unit 2101 has obtained is recorded on the primary recording medium 2102, and the entire attribute information or part of it is displayed on the display unit 2112. FIG. 9 is an example of information displayed on the display unit 2112. Information such as titles 2201, title codes 2202, singers 2203, data sources 2204 are displayed. Here, a title 2201 and a singer 2203 show the title and singer of one piece of music data. A title code 2202 is an identifier for distinguishing one piece of music data from another piece of music data. To a title code 2202, a piece of ISRC (International Standard Recording Code) information is added to, for instance. According to the information, the user selects a piece of desired music and transfers the purchase requirement with the input unit 2111. A data source 2204 is a URL (Uniform Resource Locator) for specifying the location of a piece of music data. When ISRC information is added to a title code 2202, the data source can be identified by the title code 2202.

The input unit 2111 is realized by a mouse, a keyboard, and the like. The input unit 2111 receives an instruction to purchase music, i.e., a recording instruction, and informs the data transmit/receive unit 2101 of the instruction. The user clicks the title and the like of the selected music with the mouse according to information displayed on the display unit 2112 to instruct the recording of the music data.

When receiving the instruction to record the music data, the data transmit/receive unit 2101 downloads the desired music data from the host computer of the provider through the telephone line. At this time, the location of the music data is specified according to the URL in the attribute information. The music data downloaded is once recorded on the primary recording medium 2102.

The primary recording medium 2102 is generally a hard disk in the PC, and records the desired music data without decrypting. As a result, the digital data recording apparatus is not necessarily connected to the host computer of the provider during the following operations.

The data extraction unit 2103 extracts the music data to be recorded from the primary recording medium 2102. At this time, the user selects the music data to be recorded on the secondary recording medium 2110 with the input unit 2111 according to the information displayed on the display unit 2112 that is almost equivalent to the information shown in FIG. 9. The data extracted by the data extraction unit 2103 has been encrypted in an encryption system according to the information provider, so that the encryption system judging unit 2104 judges an appropriate system to decrypt the data. For example, information for identifying the encryption system of digital data is added to the header, or the attribute information indicates the encryption system, and the encryption system judging unit 2104 judges the encryption data according to the information.

The first, second, and third decryption units, 2105, 2106, and 2107 show that digital data are decrypted in different systems according to the information providers. The number of decryption units is not limited to three. The encryption system judging unit 2104 selects one appropriate decryption unit, and the selected decryption unit decrypts encrypted data. More specifically, the encryption system judging unit 2104 obtains or creates a decryption key corresponding to the obtained encryption system of the data, and the selected decryption unit decrypts the data with the decryption key. As a result, data that have been encrypted in different encryption systems are once decrypted.

The encryption unit 2108 re-encrypts the decrypted data. In the present embodiment, information inherent in the recording medium is supposed to used as the encryption key information at the time of encryption. Note that a method of encryption according to information inherent in a recording medium is described in Japanese Laid-Open Patent Application No. 05-257816, so that a detailed explanation will not be given here.

The recording medium inherent information obtaining unit 2113 extracts the inherent information from the secondary recording medium 2110 according to an instruction from the encryption unit 2108, and transfers the extracted inherent information to the encryption unit 2108.

The encryption unit 2108 re-encrypts data using the inherent information that has been obtained by the recording medium inherent information obtaining unit 2113 as the encryption key.

Here, an explanation of the information inherent to the secondary recording medium 2110 will be given.

Each secondary recording medium 2110 has a different inherent identification information. When a secondary recording medium 2110 is a DVD-RAM, the inherent identification information is the information written in the BCA (Burst Cutting Area). Each disc has a different information in the BCA, and the information is recorded at the time of manufacturing and is not rewritable. As a result, even if a user with a malicious intent makes a copy of the content of the disc on another recording medium using a tool for bit copy, the copied data cannot be decrypted since the information for decryption key of the other recording medium is different from that of the disc. In this way, the copyright of the data is surely protected.

The recording unit 2109 records the re-encrypted data on the secondary recording medium 2110.

Figure 10:
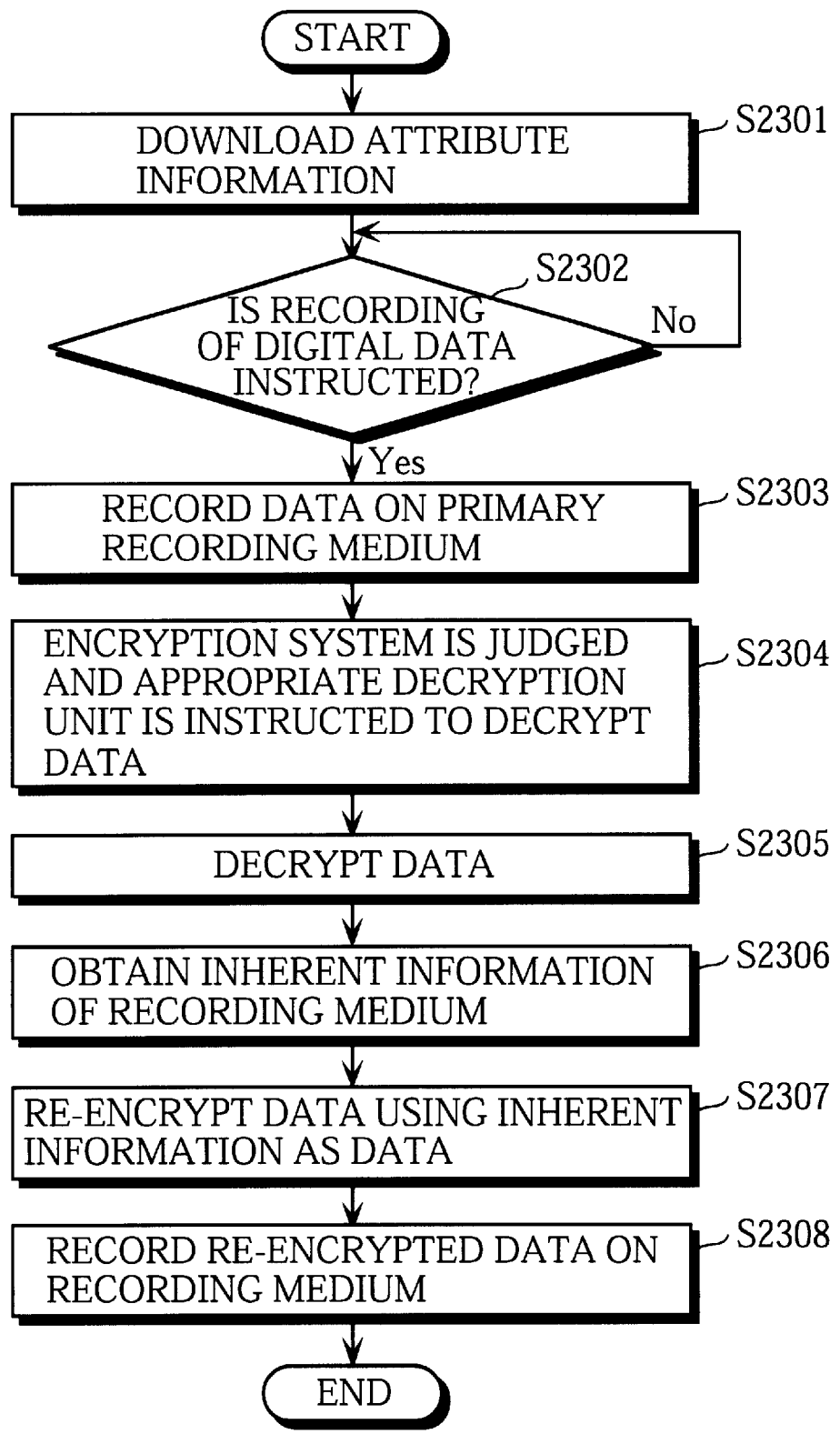
FIG. 10 is a flowchart showing the operations in the second embodiment.

An explanation of the operations by the digital data recording apparatus the structure of which has been described will be given with reference to the flowchart in FIG. 10.

The data transmit/receive unit 2101 downloads the attribute information (step s2301), and awaits for an instruction to record digital data from the user (step s2302). The data transmit/receive unit 2101 downloads designated digital data and records the digital data on the primary recording medium 2102 (step s2303). The encryption system of the downloaded data is judged, and an appropriate one of the first, second, and third decryption units 2105, 2106, and 2107 is instructed to decrypt the data (step s2304). One of the first, second, and third decryption units 2105, 2106, and 2107 decrypts the data (step s2305). When the decrypted data is input, the encryption unit 2108 obtains the inherent information of the secondary recording medium 2110 from the recording medium inherent information obtaining unit 2113 (step s2306). An encryption key is created using the obtained inherent information as part of the encryption key, and the encryption unit 2108 re-encrypts the data (step s2307). The recording unit 2109 records the re-encrypted data on the secondary recording medium 2110 (step s2308), where the processing is completed.

An explanation has been given of the digital data recording apparatus according to the second embodiment of the present invention.

An explanation of a digital data recording apparatus according to the third embodiment of the present invention will be given below.

The Third Embodiment

Figure 11:
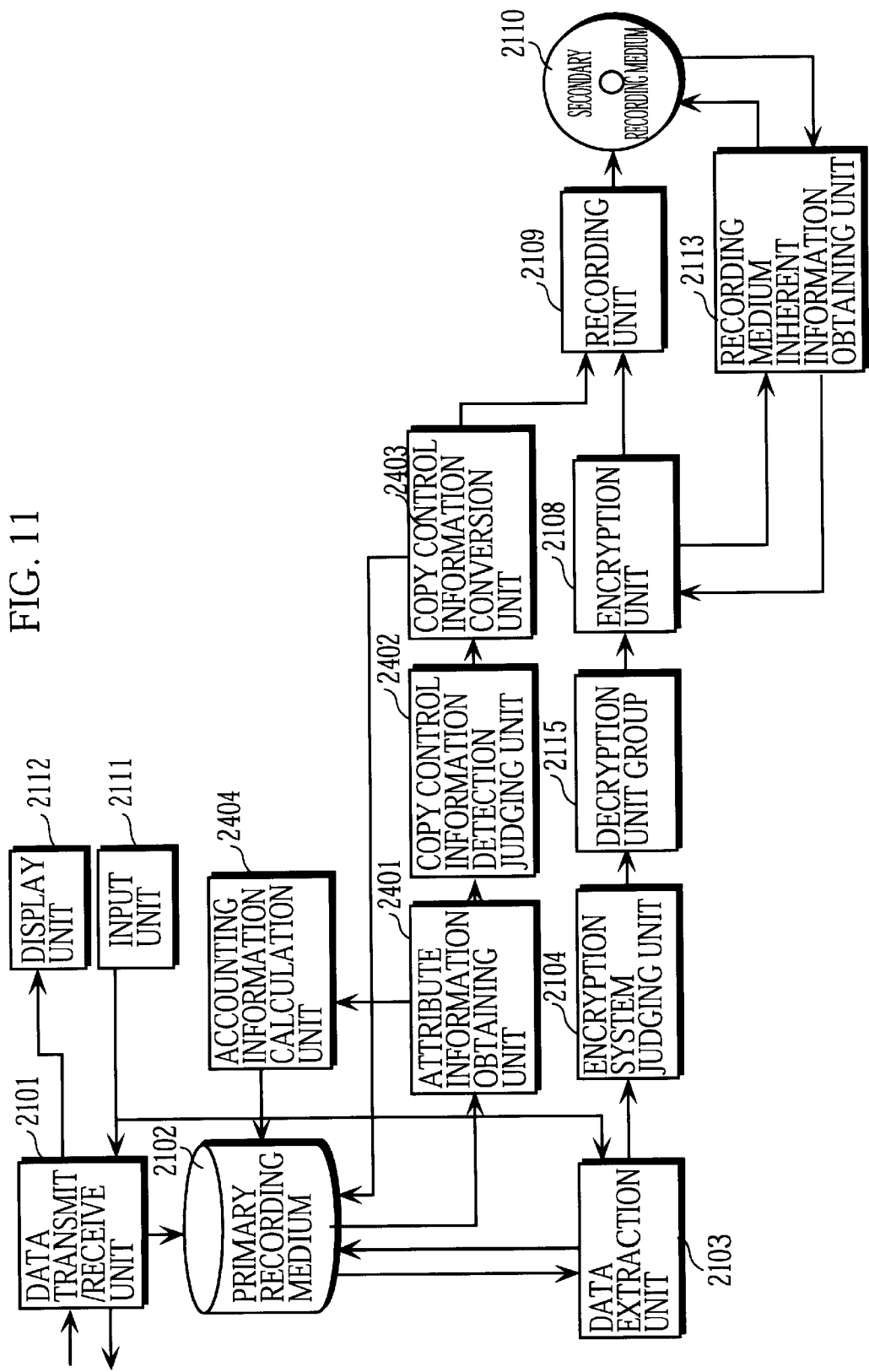
FIG. 11 shows the structure of a digital data recording apparatus according to the third embodiment of the present invention.

FIG. 11 shows the structure of the digital data recording apparatus according to the third embodiment of the present invention. The digital data recording apparatus is generally realized by a PC. The digital data recording apparatus includes a data transmit/receive unit 2101, a primary recording medium 2102, a data extraction unit 2103, an encryption system judging unit 2104, a decryption unit group 2115, an attribute information obtaining unit 2401, a copy control information detection judging unit 2402, a copy control information conversion unit 2403, an accounting information calculation unit 2404, an encryption unit 2108, a secondary recording medium 2110, an input unit 2111, a display unit 2112, and a recording medium inherent information obtaining unit 2113.

Note that the elements of the digital data recording apparatus that are the same in the second and third embodiments have the same reference numbers and explanations of the elements are not given below.

FIG. 12 shows the attribute information of data in the present embodiment. The attribute information in FIG. 12 includes copy control information 2501 and accounting information 2502 in addition to the attribute information shown in FIG. 9. The copy control information 2501 shows the number of times data can be recopied or copied. For instance, in terms of the number of times data can be recopied, a value corresponding to "no limit", "copying only (no recopying)", "no copying" and the like is shown. On the other hand, the number of times data can be copied is an integer larger than "0". More specifically, "no recopying" means that digital data that has been recorded on a secondary recording medium 2110 cannot be recopied. "No limit" means that the data can be copied any number of times. The copying times, such as, "two copies" means that data can be copied on two secondary recording media 2110.

The attribute information obtaining unit 2401 obtains attribute information corresponding to data to be reproduced from the primary recording medium 2102. In the present embodiment, the copy control information and the accounting information 2502 are extracted. Note that since attribute information includes copyright protection information and the accounting information 2502, it is desirable to record attribute information in a secure area on the primary recording medium 2102 so that attribute information could not be accessed by an ordinary user operation.

The copy control information detection judging unit 2402 extracts the copy control information from the attribute information to obtain the information indicating whether copying or recopying is allowed and the number of times data can be copied or recopied.

When copying or recopying is allowed, the copy control information conversion unit 2403 rewrites the copy control information as necessary. For instance, when recopying is prohibited, the copy control information conversion unit 2403 changes the value of the copy control information 2501 so that recopying would be prohibited. When the number of times data is copied is limited, the copy control information conversion unit 2403 changes the value so that the value would be the number that is less than the copying number allowed by "1".

When the allowed copying number is set, what is important is the number of times the data on the primary recording medium 2102 is recorded on the secondary recording medium 2110. The rewriting of the copy control information is to rewrite data recorded on the primary recording medium 2102. As a result, the allowed copying number that has been recorded on the primary recording medium 2102 is decreased by "1", and the allowed copying number that is to be recorded on the secondary recording medium is "0".

The accounting information calculation unit 2404 obtains the accounting information of the desired music data from the attribute information that has been obtained by the attribute information obtaining unit 2401, calculates the amount of charge according to the accounting information, and records the calculated amount of charge in a secure area on the primary recording medium 2102.

Figure 13:
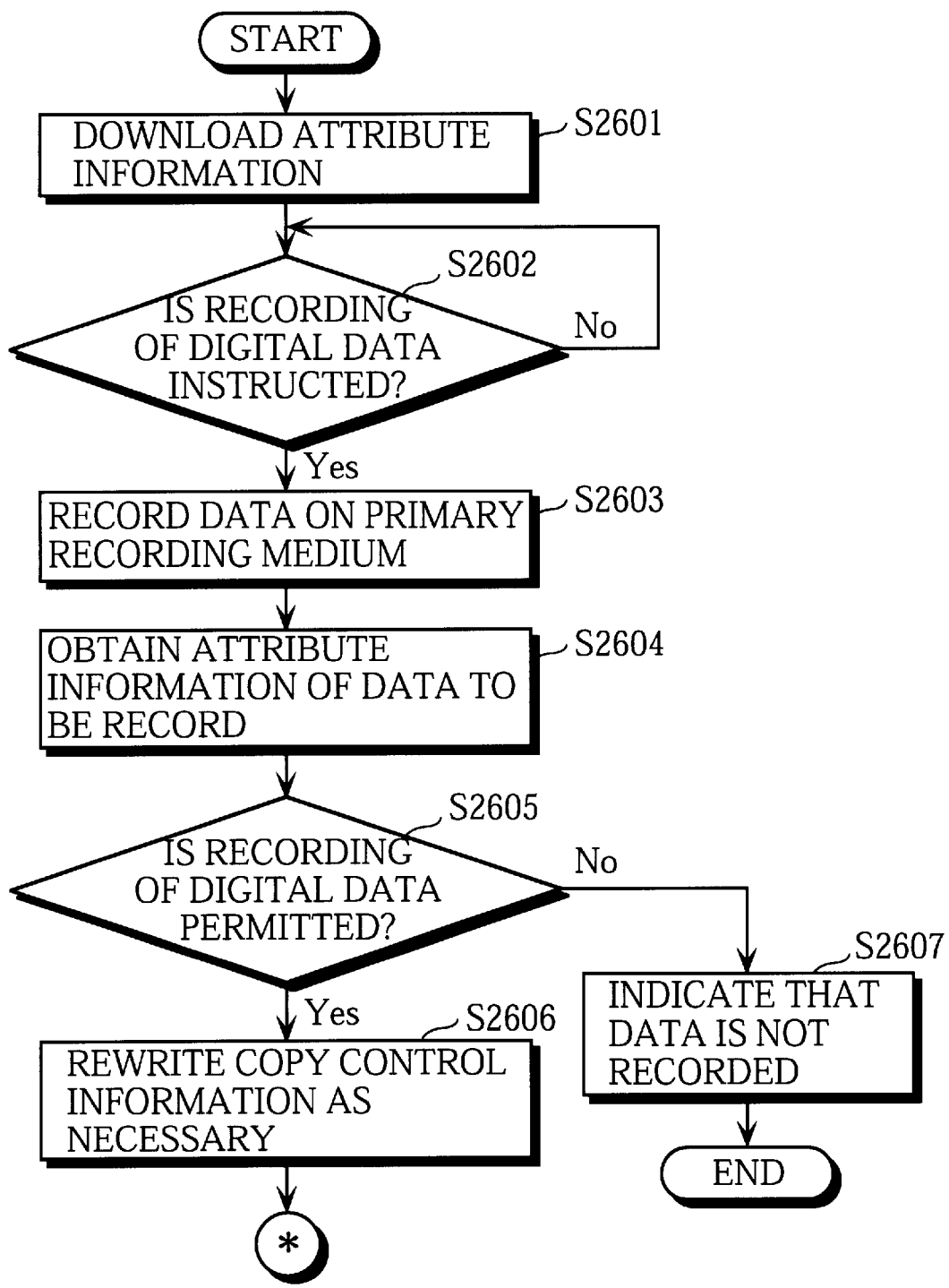
FIG. 13 is a flowchart showing operations in the third embodiment.
Figure 14:
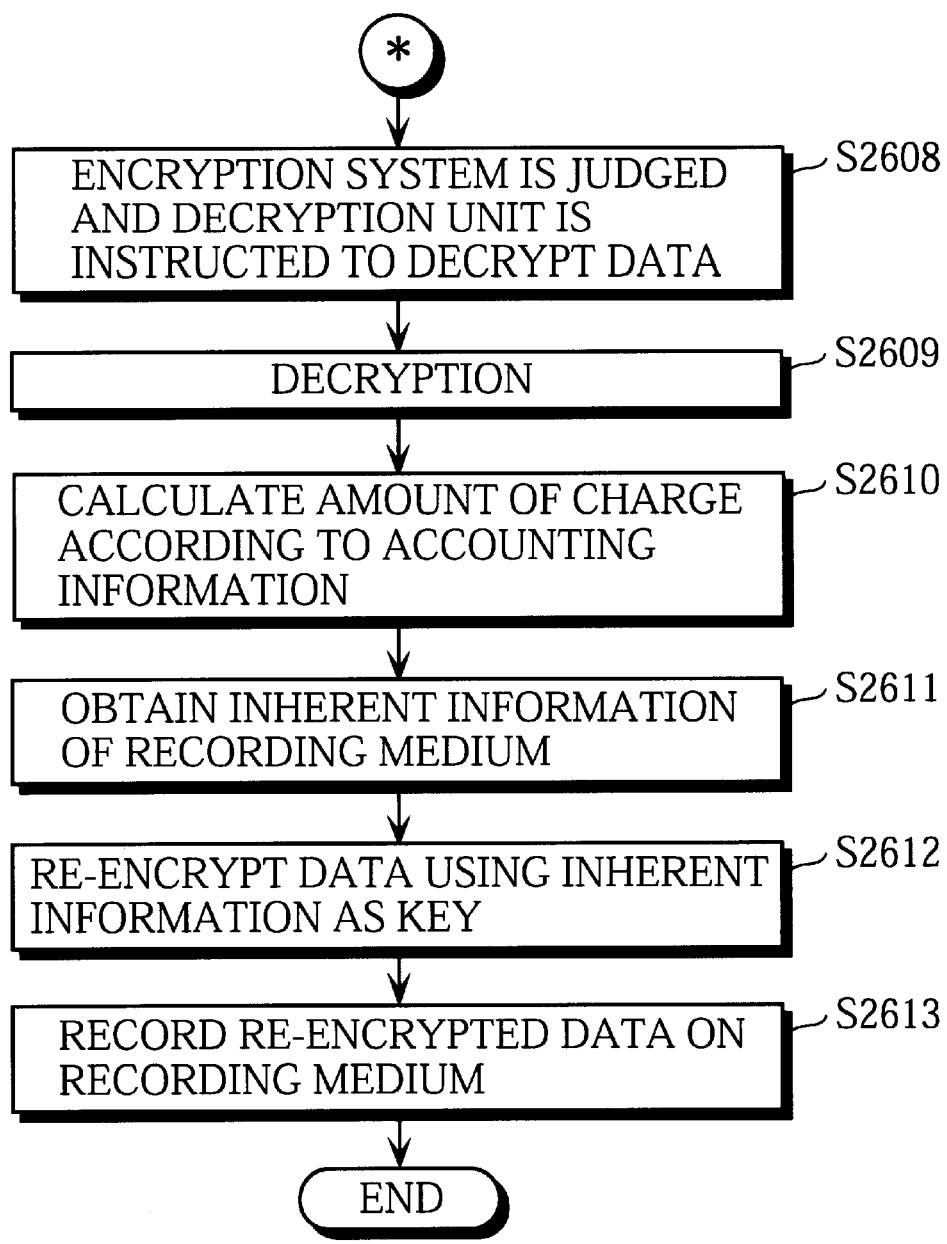
FIG. 14 is a flowchart showing operations in the third embodiment.

An explanation of the operations by the digital data recording apparatus, the structure of which has been described, will be given with reference to the flowcharts in FIGS. 13 and 14.

First, the data transmit/receive unit 2101 downloads the attribute information (step s2601), awaits a recording instruction of digital data from the user (step s2602), downloads the designated digital data, and records the downloaded digital data on the primary recording medium 2102 (step s2603). Then, the data transmit/receive unit 2101 obtains the attribute information of the data to be recorded from the attribute information obtaining unit 2401 (step s2604). The copy control information detection judging unit 2402 judges the copy control information 2501 in the attribute information and judges whether copying is allowed (step s2605). When copying is allowed, the allowed number of times of recopying or copying is obtained, and the obtained number of times is rewritten by the copy control information conversion unit 2403 as necessary (step s2606).

When copying is not allowed, the processing will be discontinued (step s2607). Then, the encryption system is judged, and an appropriate decryption unit in the decryption unit group 2115 is instructed to decrypt the digital data (step s2608). One of the first, second, and third decryption units decrypts the digital data (step s2609). After the decryption, the amount of charge is calculated according to the accounting information that has been obtained by the attribute information obtaining unit 2401 (step s2610).

Receiving the decrypted data, the encryption unit 2108 obtains the inherent information of the secondary recording medium 2110 from the recording medium inherent information obtaining unit 2113 (step s2611). An encryption key is created including the obtained inherent information as part, and encryption unit 2108 re-encrypts the data (step s2612). The recording unit 2109 records the re-encrypted data on the secondary recording medium 2110 (step s2613), and the processing is completed.

Up to this point, an explanation of the third embodiment of the present invention has been given.

The Fourth Embodiment

Figure 15:
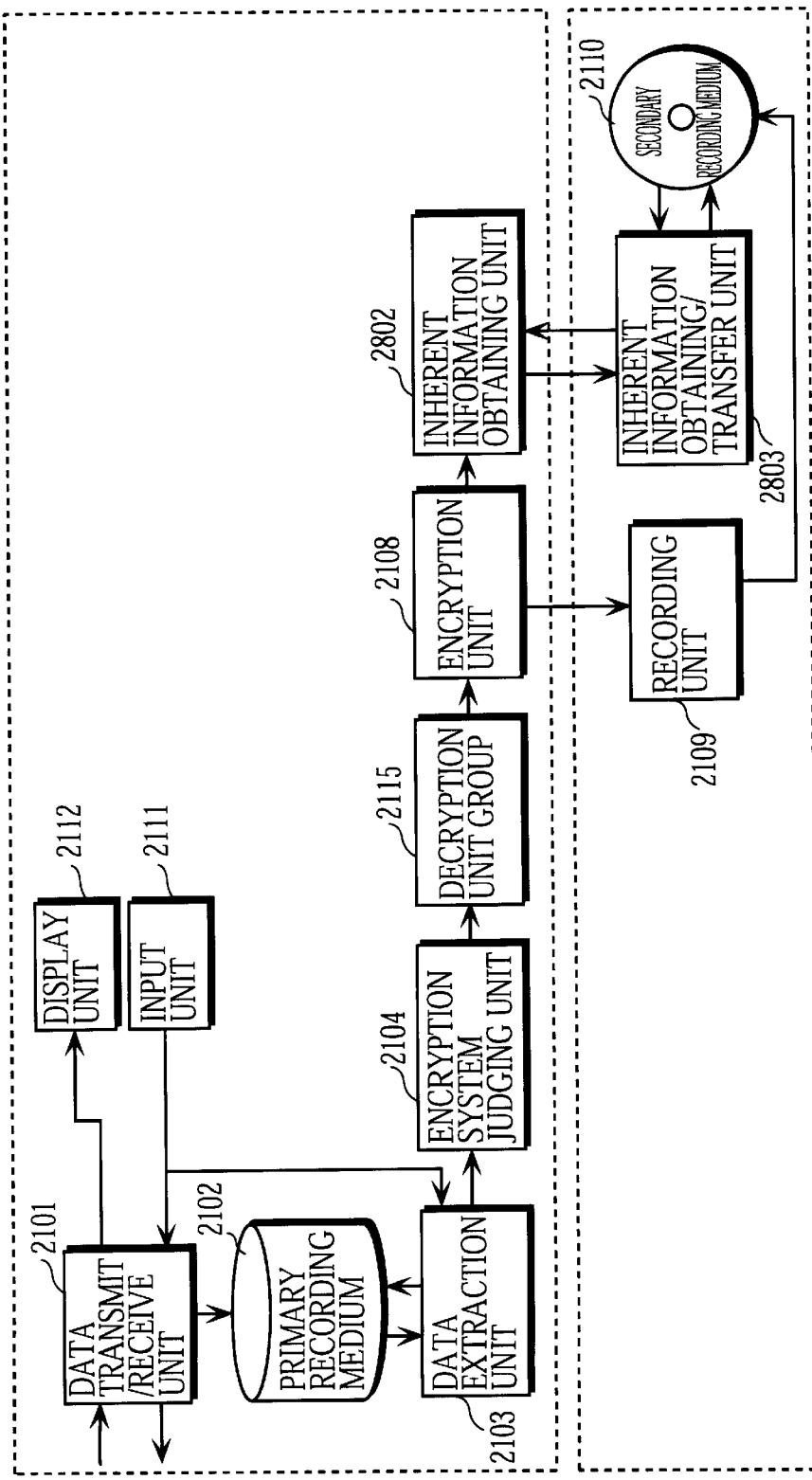
FIG. 15 shows the structure of the digital data recording apparatus according to the fourth embodiment of the present invention.

An explanation of a digital data recording apparatus according to the fourth embodiment of the present invention will be given. The digital data recording apparatus is different from the digital data recording apparatus in the second embodiment in encryption key information and in including an inherent information obtaining/transfer unit 2803, a recording unit 2109, and a secondary recording medium 2110 in a second digital data recording apparatus 2801. FIG. 15 shows the structure of the digital data recording apparatus according to the fourth embodiment of the present invention. The digital data recording apparatus is composed of first and second digital data recording apparatuses 2800 and 2801.

The first digital data recording apparatus 2800 includes a data transmit/receive unit 2101, a primary recording medium 2102, a data extraction unit 2103, an encryption system judging unit 2104, a decryption unit group 2115, an encryption unit 2108, an input unit 2111, a display unit 2112, and an inherent information obtaining unit 2802.

The second digital data recording apparatus 2801 includes the inherent information obtaining/transfer unit 2803, the recording unit 2109, and the secondary recording medium 2110.

Note that the elements of the digital data recording apparatus in the fourth embodiment that are the same in the second embodiment have the same reference numbers and explanations of the elements are not given below.

When the data that has been decrypted in the decryption unit group 2115 is input into the encryption unit 2108, the inherent information obtaining unit 2802 requires the inherent information obtaining/transfer unit 2803 in the second digital data recording apparatus 2801 to transfer inherent information. The inherent information obtaining/transfer unit 2803 obtains the identification information inherent in the secondary recording medium 2110 in the second digital data recording apparatus 2801 or the identification information inherent in the second digital data recording apparatus 2801, and transfer the obtained identification information to the inherent information obtaining unit 2802.

The encryption unit 2108 creates an encryption key using the identification information inherent in the secondary recording medium 2110 in the second digital data recording apparatus, the identification information inherent in the second digital data recording apparatus 2801, or the combination of these identification information, and re-encrypts the decrypted data, and outputs the re-encrypted data to the second digital data recording apparatus 2801. The recording unit 2109 in the second digital data recording apparatus 2801 records the re-encrypted data on the secondary recording medium 2110.

Note that inherent information that is obtained and transferred by the inherent information obtaining/transfer unit 2803 is the identification information inherent in the second digital data recording apparatus 2801 when the secondary recording medium 2110 is fixed in the second digital data recording apparatus 2801, and is the identification information inherent in the secondary recording medium 2110 or the combination of the identification information inherent in the second digital data recording apparatus 2801 and the identification information inherent in the secondary recording medium 2110 when the secondary recording medium 2110 is removable from the second digital data recording apparatus 2801. As a result, more flexible encryption systems can be available.

Up to this point, an explanation of the fourth embodiment of the present invention has been given.

The Fifth Embodiment

Here, an explanation of a digital data recording apparatus according to the fifth embodiment of the present invention will be given. The digital data recording apparatus is almost the same as those in the second, third, and fourth embodiment. The explanation of the digital data recording apparatus will be given with reference to the block diagram in FIG. 15 used in the fourth embodiment. The digital data recording apparatus in the fifth embodiment is different from that in the fourth embodiment in adopting an encryption system corresponding to the secondary recording medium 2110 at the time of recording. More specifically, since the minimum unit of data, or the unit of data amount at the time of writing encrypted data is different for a DVD-RAM and a semiconductor memory, the inherent information obtaining unit 2802 obtains information of the medium from the inherent information obtaining/transfer unit 2803 to re-encrypt data in a optimal unit of data. As a result, a plurality of encryption units 2108 are included and inherent information and medium information are transferred to an appropriate encryption unit. By doing so, not only a DVD-RAM but also a semiconductor memory, an IC card, and a hard disk can be used as the secondary recording medium 2110.

Up to this point, an explanation of the fifth embodiment has been given.

Note that the second to fifth embodiments have been explained as examples of system by which optimal effects can be expected under the present situation. The embodiments can be changed within the range of the basic principles of the present invention. Examples of changed embodiments will be given below.

In the second to fifth embodiments, digital data is downloaded from the host computer when the user requests to purchase the digital data. It is possible to record digital data on the primary recording medium 2102 in the user's PC regardless of the purchase and to request to purchase digital data that has been recorded on the primary recording medium 2102.

In the second to fifth embodiments, copy control information is indicated in attribute information. It is possible to embed copy control information into digital data using Water Mark technology.

While it has been explained that accounting information is recorded in a secure area on the primary recording medium 2102, it is possible to provide another recording medium such as an IC card than the primary recording medium 2102 to record accounting information.

While the information provided by the information provider is audio information in the second to fifth embodiments, the information is not limited to audio information. The information can be video information, audio information, character information, or the combination of video, audio, and character information.

The Sixth Embodiment

Figure 16:
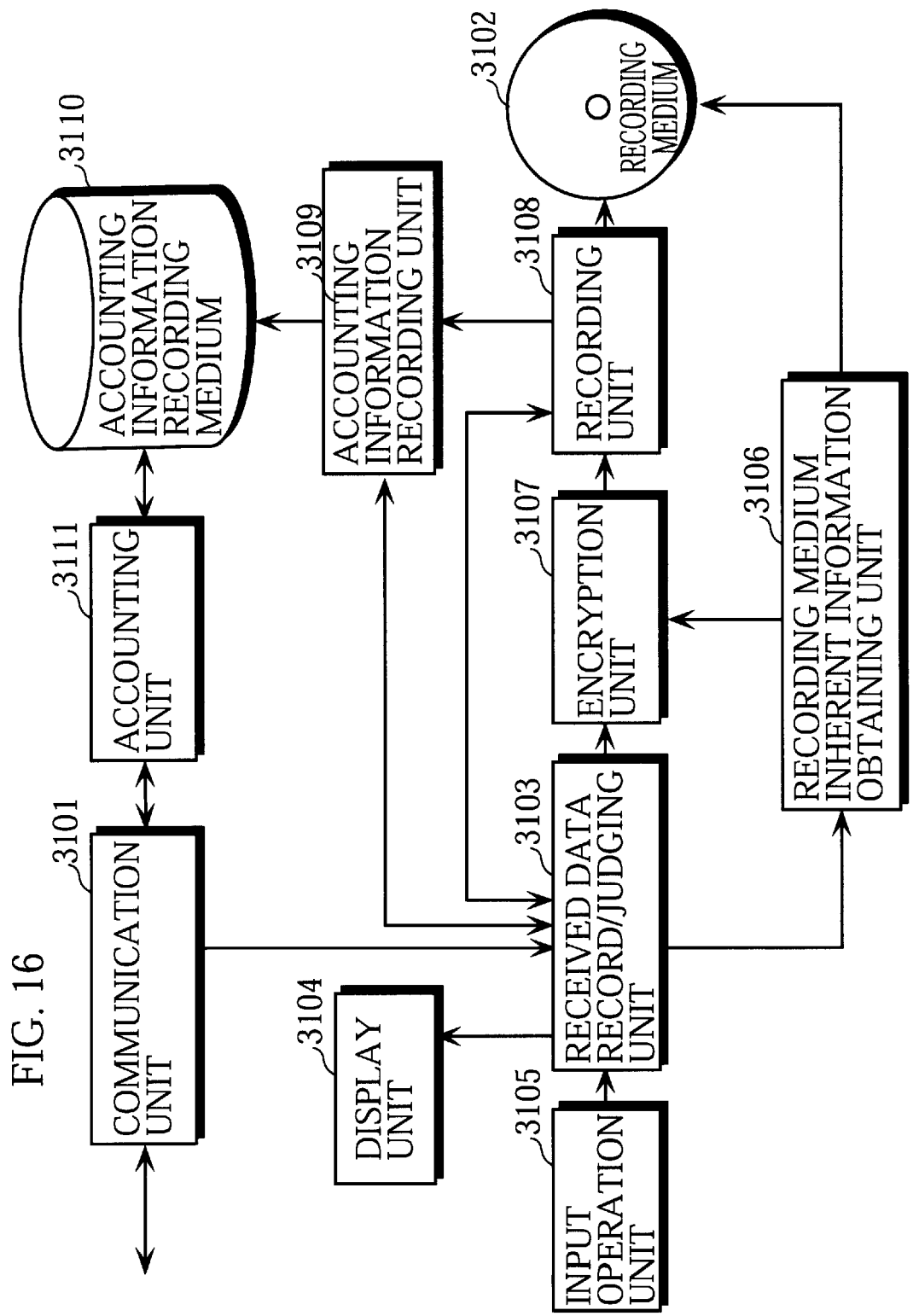
FIG. 16 shows the structure of a digital data recording apparatus according to the sixth embodiment of the present invention.

FIG. 16 shows the structure of a digital data recording apparatus according to the sixth embodiment of the present invention.

The digital data recording apparatus includes a communication unit 3101, a recording medium 3102, a received data record/judging unit 3103, a display unit 3104, an input operation unit 3105, a recording medium inherent information obtaining unit 3106, an encryption unit 3107, a recording unit 3108, an accounting information recording unit 3109, an accounting information recording medium 3110, and an accounting unit 3111. The digital data recording apparatus is realized by a PC.

The communication unit 3101 is realized by a modem, and is connected to the host computer (not illustrated) of a data provider and an accounting center (not illustrated) via a telephone line. When receiving digital data and the attribute information from the host computer, the communication unit 3101 informs the received data record/judging unit 3103 of the reception.

When receiving an inquiry of charge from the accounting center, the communication unit 3101 informs the accounting unit 3111 of the inquiry. When informed of accounting information by the accounting unit 3111, the communication unit 3101 informs the accounting center of accounting information via the telephone line.

Note that digital data provided by the data provider is supposed to be music data in the present embodiment. Music data to be provided is supposed to be encrypted digital data, and an information identifier is supposed to be added to a piece of digital data. The information identifier of a piece of music is supposed to be the title code for distinguishing the music from another piece of music.

Attribute information is also supposed to be added to a piece of digital data. Attribute information includes information indicating the charge and the provider of digital data.

FIG. 17 is an example of attribute information. Attribute information 3201 includes titles 3202, performers (singers) 3203, title codes 3204, recording charges 3205, charges per reproduction 3206, maximum numbers of reproducing 3207, encryption conditions 3208, and copy permission 3209.

The titles 3202 and the performers 3203 are displayed on the display unit 3104. The user indicates to copy (replicate) digital data according to the titles 3202 and the performers 3203. A title code is unique to a piece of music for distinguishing the music from another piece of music. For instance, an ISRC is used as a title code 3204. Note that the ISRC is composed of a country code (two ASCII characters), an owner code (three ASCII characters), a recording year (two-digit numbers), and a serial number (five-digit numbers).

A recording charge 3205, a charge per reproduction 3206, a maximum number of reproducing 3207, and the like are included in accounting standard data, and are information for calculating the charges of a piece of music data.

A recording charge 3205 indicates a charge when digital data that has been received by the communication unit 3101 is recorded on the recording medium 3102. A charge per reproduction 3206 indicates the charge for reproducing digital data once that has been recorded on the recording medium 3102. A maximum number of reproducing 3207 indicates the maximum number of times that digital data that has been recorded on the recording medium 3102 can be reproduced. For instance, when a maximum number of reproducing 3207 is "100", the digital data can be reproduced up to 100 times. Note that it is possible to set a maximum number of reproducing 3207 so that no additional charge is required after the number of reproducing reaches a certain number of times.

An encryption condition 3208 is a flag showing whether digital data that has been received by the communication unit 3101 is an encrypted data.

Copy permission 3209 is a flag recorded by the user and shows whether it is permitted to record music data that has been received by the recording medium 3102. For instance, "only once" indicates that the music data is permitted to be recorded only once, and "permitted" indicates that the music data is permitted to be recorded any number of times.

Note that the main object of the present invention is to protect the copyright of received music data when the music data is recorded (replicated) on the recording medium 3102, so that an explanation of a case where it is only permitted to listen to music data will be given briefly. In this case, the copy permission 3209 is "not permitted". While neither decryption unit nor input unit is included in the structure shown in FIG. 16, digital data that has been received by the communication unit 3101 is decrypted by a decryption unit to input music from an input unit. At this time, the accounting standard data includes a listening charge.

The recording medium 3102 is composed of a rewritable storage element such as a DVD-RAM and is removable from the digital data recording apparatus.

In a non-rewritable secure area on the recording medium 3102, inherent information of the recording medium 3102 is recorded in advance.

On the recording medium 3102, the digital data that has been re-encrypted by the encryption unit 3107 is recorded by the recording unit 3108.

In addition, the management information and attribute information of the recorded digital data are recorded on the recording medium 3102 by the recording unit 3108.

When informed of digital data and the attribute information 3201 from the communication unit 3101, the received data record/judging unit 3103 stores the attribute information 3201, has the display unit 3104 display the title 3202, the player 3203, the recording charge 3205, the charge per reproduction 3206 and the like, and informs the encryption unit 3107 of the digital data.

When receiving an instruction to copy (replicate) music, the received data record/judging unit 3103 judges whether the digital data corresponding to the title code 3204 of the designated music can be copied on referring to the copy permission 3209. When the digital data can be copied, the received data record/judging unit 3103 instructs the recording medium inherent information obtaining unit 3106 to obtain the inherent information of the recording medium 3102, and informs the encryption unit 3107 of the title code 3204 and the encryption condition 3208.

When it is not permitted to copy the digital data, the received data record/judging unit 3103 has the display unit 3104 display the judgement result.

When notified that the digital data has been copied by the recording unit 3108, the received data record/judging unit 3103 rewrites the copy permission 3209 in the stored attribute information 3201. More specifically, when the copy permission 3209 is "only once", the "only once" is changed to "not permitted". When the number of times of copying is greater than one, the number is decreased by one. Note that the storage area for storing the attribute information 3201 is in the EEPROM (Electrically Erasable and Programmable ROM), so that the storage content is not erased when the power of the digital data recording medium is turned off the storage content is not erased.

For instance, when informed of the completion of copying by the recording unit 3108 after informing the encryption unit 3107 of the title code 3204 "song01", the received at a record/judging unit 3103 changes the copy permission 3209 corresponding to the title code "song01" from "only once" to "not permitted". As a result, the violation of the data provider copyright can be protected.

The display unit 3104 is composed of a liquid crystal display or a CRT (Cathode-Ray-Tube). The display unit 3104 displays the title of music data (digital data) or indicates that the digital data cannot be copied under the control of the received data record/judging unit 3103.

The input operation unit 3105 is composed of a mouse and the like. The input operation unit 3105 receives the user's instruction to copy digital data and informs the received data record/judging unit 3103 of the instruction. When downloading a piece of music on referring to titles and players displayed by the display unit 3104, the user clicks the tile and the like with the mouse and instructs the copying of the music.

When receiving an instruction to obtain the inherent information from the received data record/judging unit 3103, the recording medium inherent information obtaining unit 3106 reads the inherent information that has been recorded in a secure area on the recording medium 3102 and informs the encryption unit 3107 of the read inherent information.

The encryption unit 3107 creates an encryption key according to the inherent information that has been received from the recording medium inherent information obtaining unit 3106. The encryption unit 3107 re-encrypts the digital data that has been received from the received data record/judging unit 3103 using the created encryption key and informs the recording unit 3108 of the re-encrypted digital data.

Note that when informed that the digital data that has been received from the received data record/judging unit 3103 has been encrypted, the encryption unit 3107 has the digital data be decrypted or use the digital data without a decryption.

More specifically, when informed of digital data "data A", which is to be recorded on the recording medium 3102, by the received data record/judging unit 3103, the encryption unit 3107 creates an encryption key "KM" according to the inherent information of the recording medium 3102 and re-encrypts the digital data "data A" to create encrypted digital data "E (KM, dataA)". When the digital data "dataA" is to be recorded on another recording medium and an encryption key "K'M" is created according to the-inherent information of the other recording medium, the encrypted digital data "E" is encrypted digital data "E(K'M, dataA)".

The technology of digital data encryption is described in Japanese Laid-Open Patent Application No. 05-257816.

The recording unit 3108 records the encrypted digital data on the recording medium 3102 that has been received from the encryption unit 3107. At this time, the recording unit 3108 creates the management information of the recorded digital data on the recording medium 3102.

FIG. 18 shows an example of management information. Management information 3301 includes title codes 3204, which are the identifiers of recorded digital data, recording start addresses 3302, and recording end addresses 3303 of the recorded digital data. In the management information 3301, each of the title codes 3204 correspond to different recording start addresses 3302, and recording end addresses 3303.

When digital data recorded on the recording medium 3102 is reproduced, the management information 3301 is referred to.

When finishing recording the encrypted digital data and the management information on the recording medium 3102, the recording unit 3108 reads the attribute information 3201 that has been stored in the received data record/judging unit 3103 corresponding to the recorded digital data, and writes the read attribute information 3201 on the recording medium 3102. In addition, the recording unit 3108 informs the received data record/judging unit 3103 of the completion of the copying, and informs the accounting information recording unit 3109 of the title code of the recorded digital data.

When informed of the title code 3204 by the recording unit 3108, the accounting information recording unit 3109 reads the recording charge 3205 of the attribute information 3201 corresponding to the title code 3204 that has been stored in the received data record/judging unit 3103. When finding that the recording charge 3205 must be paid, the accounting information recording unit 3109 records the title code 3204 and the recording charge 3205 on the accounting information recording medium 3110 as the accounting information.

The accounting information recording medium 3110 is composed of a RAM card and the like. On the accounting information recording medium 3110, the accounting information of digital data is recorded by the accounting information recording unit 3109 that has been downloaded on the recording medium 3102.

When receiving an inquiry of a charge from the accounting center (not illustrated) via the communication unit 3101, the accounting unit 3111 reads outstanding accounting information that has been recorded on the accounting information recording medium 3110, and informs the communication unit 3101 of the read outstanding accounting information. After informing the communication unit 3101 of the outstanding accounting information, the accounting unit 3111 records a flag indicating that the accounting center has been informed of outstanding accounting information (indicating settlement) on the accounting information recording medium 3110.

Figure 19:
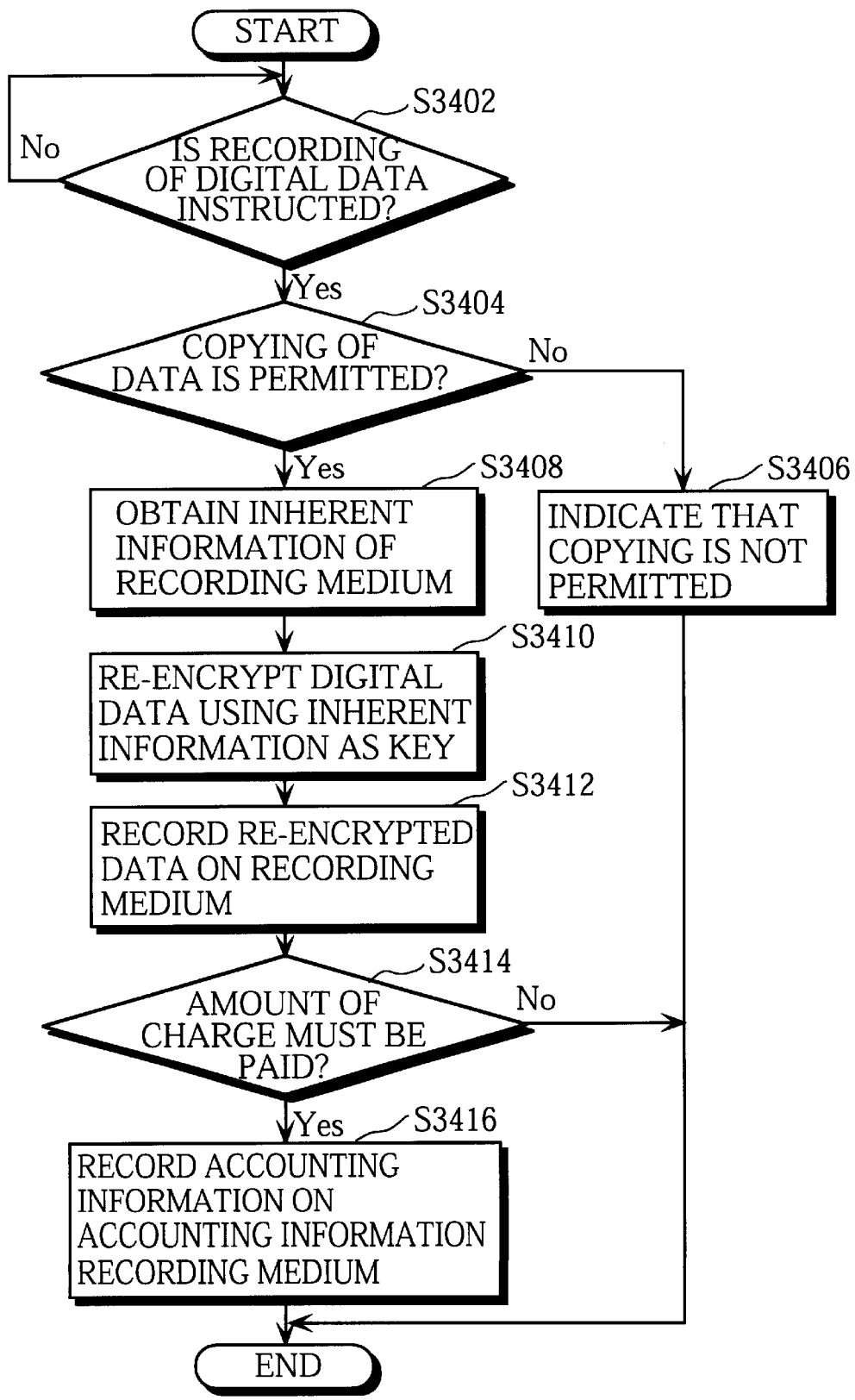
FIG. 19 is a flowchart showing operations in the sixth embodiment.

Here, an explanation of operations in the present embodiment will be given with reference to the flowchart in FIG. 19.

The received data record/judging unit 3103 awaits an indication to record digital data from the user (step s3402), and judges whether it is permitted to copy the designated digital data on referring to the attribute information 201 (step s3404). When it is not permitted to copy the digital data, the received data record/judging unit 3103 has the display unit 3104 indicate that the copying is not permitted (step s3406) to complete the processing.

When it is permitted to copy the digital data, the recording medium inherent information obtaining unit 3106 obtains the inherent information of the recording medium 3102 that has been recorded in a secure area on the recording medium 3102, and informs the encryption unit 3107 of the obtained inherent information (step s3408).

The encryption unit 3107 creates an encryption key according to the inherent information and re-encrypts the digital data (step s3410).

The recording unit 3108 records the encrypted digital data on the recording medium 3102 (step s3412).

Then, the accounting information recording unit 3109 judges whether the recording charge of the recorded digital data must be paid (step s3414). When the recording charge is free, the processing is completed. When the recording charge must be paid, the accounting information recording unit 3109 records the accounting information on the accounting information recording medium 3110 (step s3416) to complete the processing.

Figure 20:
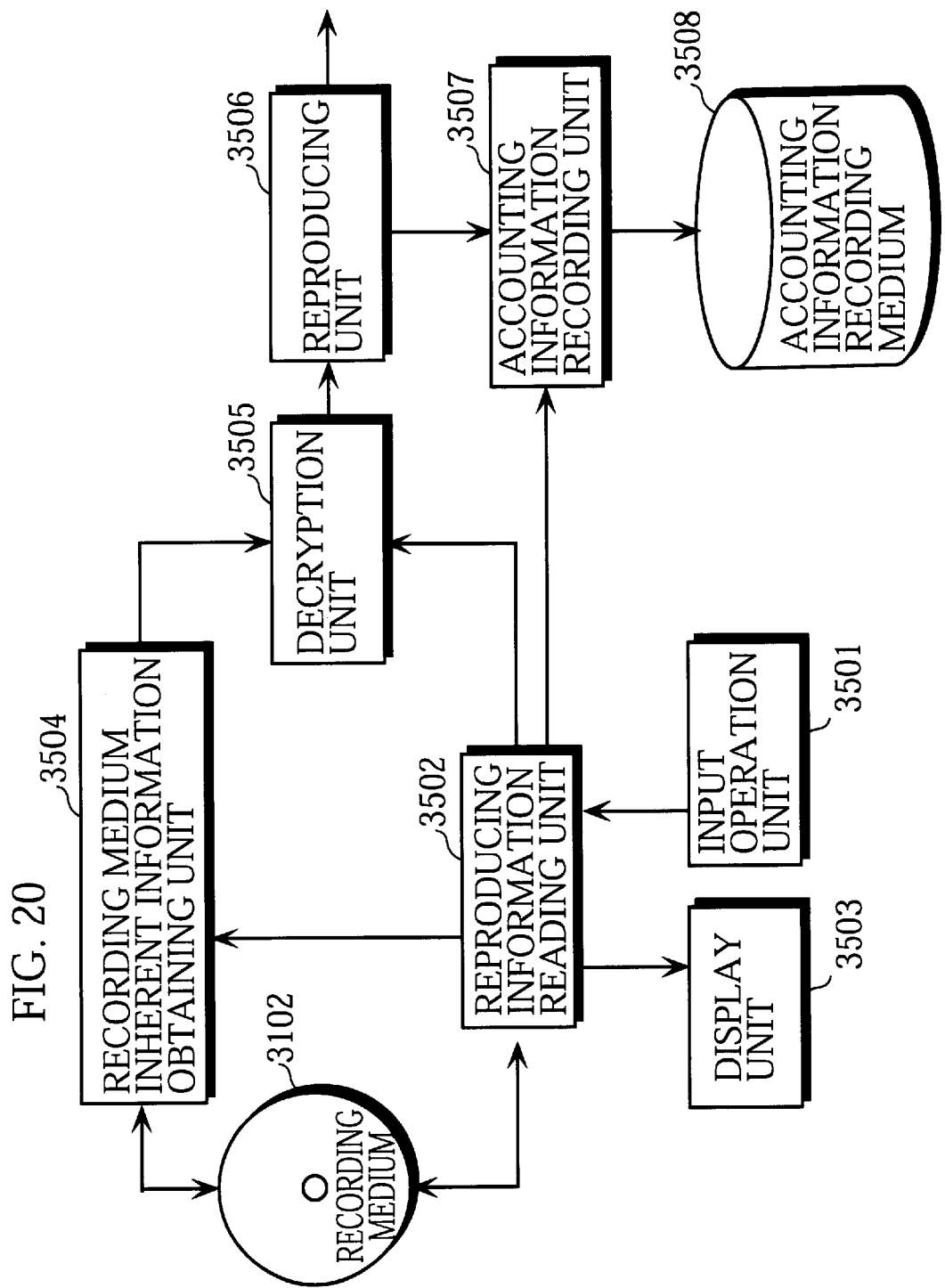
FIG. 20 shows the structure of a playback apparatus for reproducing digital data that has been recorded in the sixth embodiment.

FIG. 20 shows the structure of a playback apparatus for reproducing digital data that has been recorded on the recording medium 3102 by the digital data recording apparatus.

The digital data playback apparatus includes a recording medium 3102, an input operation unit 3501, a reproducing information reading unit 3502, a display unit 3503, a recording medium inherent information obtaining unit 3504, a decryption unit 3505, a reproducing unit 3506, an accounting information recording unit 3507, and an accounting information recording medium 3508.

On the recording medium 3102, digital data that has been re-encrypted in the digital data recording apparatus, the management information 3301, the attribute information 3201, and the inherent information for identifying the recording medium 3102 has been recorded.

When receiving an instruction to start reproducing, the input operation unit 3501 gives the reproducing information reading unit 3502 an instruction of initial activation. When receiving the designation of a title from the user, the input operation unit 3501 informs the reproducing information reading unit 3502 of the title. Note that not only when initial activation is instructed, but also when the recording medium 3102 is inserted into the digital data playback apparatus, the instruction of automatic playback mode is given to the reproducing information reading unit 3502.

When receiving the instruction of initial activation, the reproducing information reading unit 3502 reads the attribute information 3201 that has been recorded on the recording medium 3102, and has the display unit 3503 indicate items in the attribute information 3201 such as the titles 3202 and players 3203.

When receiving the instruction of a piece of music or the instruction of automatic playback mode from the input operation unit 3501, the reproducing information reading unit 3502 judges whether the maximum number of reproducing 3207 in the attribute information 3201 is equal to or greater than "1". When the maximum number of reproducing 3207 is equal to or greater than "1", the reproducing information reading unit 3502 reads the title code 3204 and encrypted digital data that has been recorded from the recording start address 3302 to the recording end address 3303, and informs the decryption unit 3505 of the read digital data. At this time, the reproducing information reading unit 3502 instructs the recording medium inherent information obtaining unit 3504 to obtain the inherent information, and informs the accounting information recording unit 3507 of the title code 3204 and the charge per reproduction. Then, when the digital data has been read, the reproducing information reading unit 3502 rewrites the maximum number of reproducing 3207, which is an item of the attribute information 3201, by decreasing the value of the maximum number of reproducing 3207 by one. Note that when the maximum number of reproducing 3207 is "no limit", the maximum number of reproducing 3207 is not rewritten.

When judging that the maximum number of reproducing is less than "1", the reproducing information reading unit 3502 has the display unit 3502 indicates that the digital data cannot be reproduced any more.

The display unit 3503 is composed of a liquid crystal display and the like, and displays the list of titles that have been read by the reproducing information reading unit 3502 and other information. In addition, when the user designates a title of music data that has been reproduced the maximum number of times, the display unit 3503 indicates that the music data cannot be reproduced any more.

When instructed by the reproducing information reading unit 3502 to obtain the inherent information, the recording medium inherent information obtaining unit 3504 obtains the inherent information, which is the identifier of the recording medium 3102 from a secure area on the recording medium 3102, and informs the decryption unit 3505 of the obtained inherent information.

When informed of the inherent information by the recording medium inherent information obtaining unit 3504 and of the encrypted digital data from the reproducing information reading unit 3502, the decryption unit 3505 creates a decryption key according to the inherent information, decrypts the encrypted digital data, and informs the reproducing unit 3506 of the decrypted digital data.

When informed of the decrypted digital data by the decryption unit 3505, the reproducing unit 3506 decodes the digital data to reproduce music. After the reproducing of the music, the reproducing unit 3506 informs the accounting information recording unit 3507 that the reproducing is finished.

When informed that the reproducing is finished by the reproducing unit 3506, the accounting information recording unit 3507 records the title code 3204 and the charge per reproduction 3206 that have been received from the reproducing information reading unit 3502 and the reproducing date as the accounting information on the accounting information recording medium 3508. Note that when the charge per reproduction 3206 is "free", the charge per reproduction 3206 is not recorded.

The accounting information recording medium 3508 is composed of a RAM card and the like. On the accounting information recording medium 3508, accounting information is recorded by the accounting information recording unit 3507.

Figure 21:
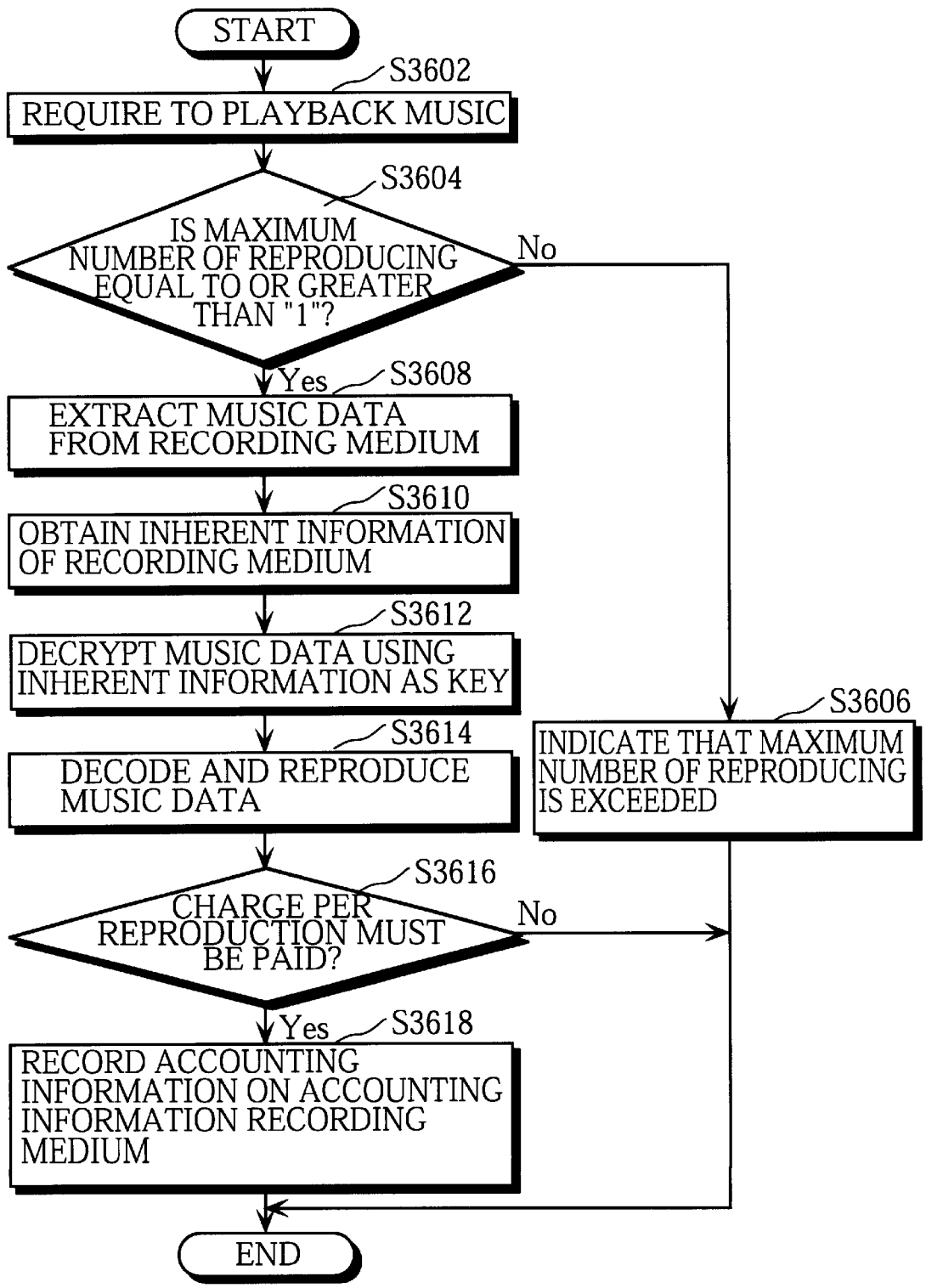
FIG. 21 is a flowchart showing operation by the digital data playback apparatus in the sixth embodiment.

Here, an explanation of operation by the digital data playback apparatus will be given with reference to the flowchart shown in FIG. 21.

First, the user instructs the start of reproduction using, for instance, a remote control of the input operation unit 3501, and designates a title of music displayed by the display unit 3503. The reproducing information reading unit 3502 regards the designation as a requirement to reproduce the music data (digital data) corresponding to the title (step s3602), and judges whether the maximum number of reproducing 3207 of the music is equal to or greater than "1" on referring to the attribute information 3201 (step s3604). When the maximum number of reproducing 3207 is less than "1", the reproducing information reading unit 3502 has the display unit 3503 indicate that the music data has been reproduced the maximum number of times (step s3606) to complete the processing.

When the maximum number of reproducing 3207 is equal to or greater than "1", the reproducing information reading unit 3502 reads the encrypted digital data from the recording medium 3102 and informs the decryption unit 3505 of the read digital data (step s3608).

Meanwhile, the recording medium inherent information obtaining unit 3504 obtains the inherent information from the recording medium 3102 and informs the decryption unit 3505 of the obtained inherent information (step s3610).

The decryption unit 3505 decrypts the encrypted digital data using the inherent information as the decryption key (step s3612).

The reproducing unit 3506 decodes the digital data to reproduce and output music (step s3614).

Then, the accounting information recording unit 3507 judges whether the charge per reproduction 3206 must be paid (step s3616). When the charge per reproduction 3206 is "free", the processing is completed. When the charge per reproduction 3206 must be paid, the accounting information recording unit 3507 records the accounting information on the accounting information recording medium 3508 (step s3618) to complete the processing.

The Seventh Embodiment

Figure 22:
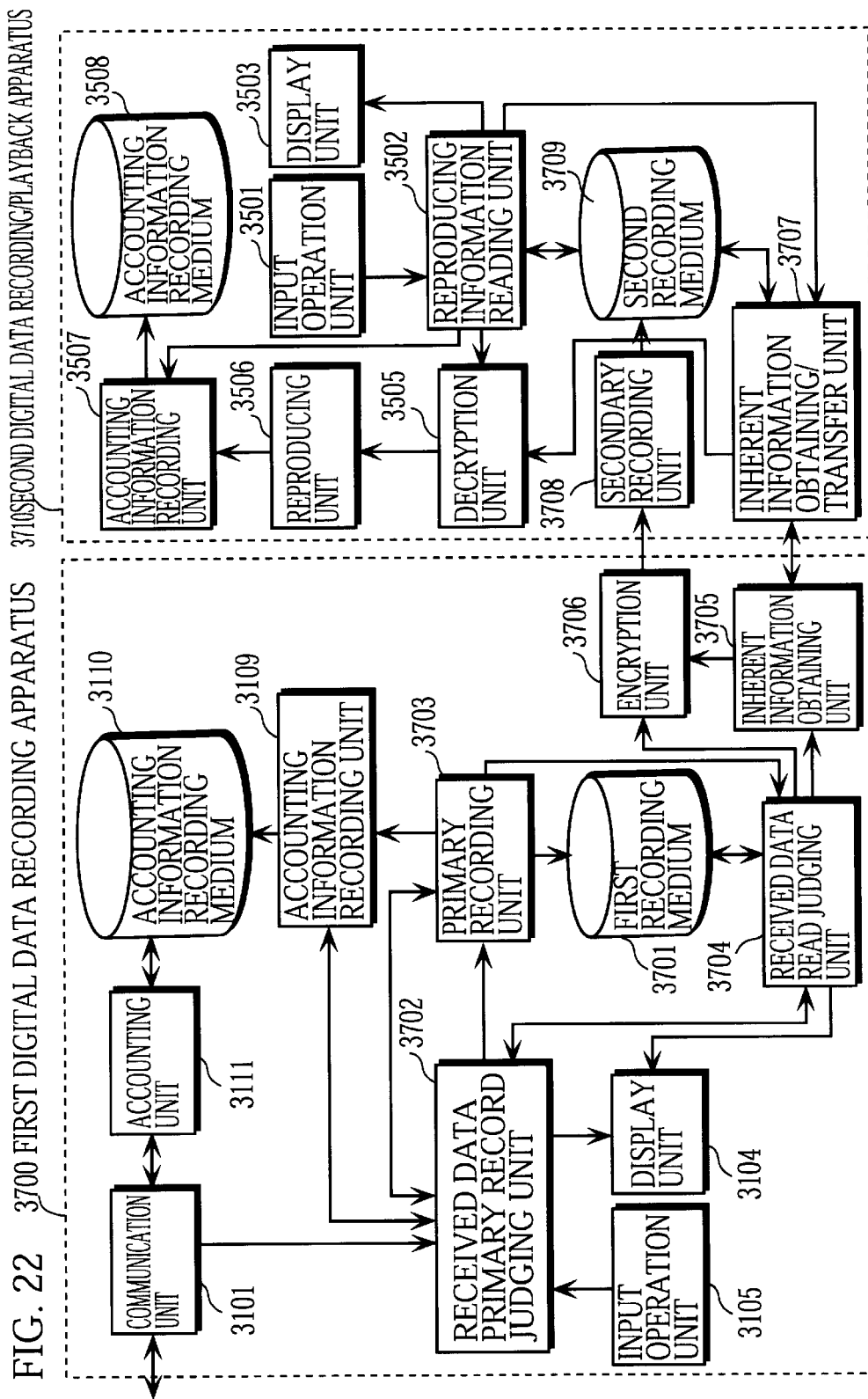
FIG. 22 shows the structure of a digital data recording apparatus according to the seventh embodiment of the present invention.

FIG. 22 shows the structure of a digital data recording apparatus according to the seventh embodiment of the present invention. The digital data recording apparatus includes a first digital data recording apparatus 3700 and a second digital data recording/playback apparatus 3710.

The first digital data recording apparatus 3700 includes a first recording medium 3701, a communication unit 3101, a received data primary record/judging unit 3702, a display unit 3104, an input operation unit 3105, a primary recording unit 3703, a received data read/judging unit 3704, an inherent information obtaining unit 3705, an encryption unit 3706, an accounting information recording unit 3109, an accounting information,recording medium 3110, and an accounting unit 3111. The first digital data recording apparatus is realized by a PC.

The second digital data recording/playback apparatus includes an inherent information obtainment/transfer unit 3707, a secondary recording unit 3708, a second recording medium 3709, an input operation unit 3501, a reproducing information reading unit 3502, a display unit 3503, a decryption unit 3505, a reproducing unit 3506, an accounting information recording unit 3507, and an accounting information recording medium 3508.

Note that the elements of the first digital data recording apparatus 3700 and the second digital data recording/playback apparatus in the seventh embodiment that are the same in the digital data recording apparatus and the digital data playback apparatus in the sixth embodiment have the same reference numbers and explanations of the elements are not given below.

First, an explanation of the first digital data recording apparatus 3700 will be given. The first digital data recording apparatus 3700 is different from the digital data recording apparatus in the sixth embodiment in the points that the first recording medium 3701 is fixed in the first digital data recording apparatus 3700 and digital data that has been recorded on the first recording medium 3701 is output after being encrypted for secondary recording.

The first recording medium 3701 is composed of a rewritable recording element such as a hard disk that is fixed in the first digital data recording apparatus 3700. On the first recording medium 3701, digital data (music data) that has been received by the communication unit 3101 and the management information of the digital data are recorded by the primary recording unit 3703.

The received data primary record/judging unit 3702 writes attribute data attached to the digital data that has been received by the communication unit 3101 in a storage area in an EEPROM. One example of attribute information that is received in the present embodiment is shown in FIG. 23. Attribute information 3801 is different from the attribute information 3201 in the sixth embodiment in the point that secondary recording charges 3802, copy permission (primary) 3803, and copy permission (secondary) are indicated.

The attribute information 3801 shows that neither of the primary and secondary copying is not permitted and only listening in real time is permitted for a title "music E" having title code "song05".

When instructed secondary recording of music by the user, the received data primary record/judging unit 3702 judges whether primary recording is permitted for the music on referring to an item in the attribute information 3801, copy permission (primary) 3803. When the primary recording is not permitted, the received data primary record/judging unit 3702 has the display unit 3104 indicate that the primary recording for the music is not permitted. When the primary recording is permitted, the received data primary record/judging unit 3702 informs the primary recording unit 3703 of the digital data of the music. Other functions of the received data primary recording judging unit are the same as of the received data record/judging unit 3103.

The primary recording unit 3703 records the received digital data on the first recording medium 3701. At this time, the management information is also written as in the case of the recording unit 3108 in the sixth embodiment. Note that while an encryption key is created according to the inherent information of the recording medium 3102 to re-encrypt digital data in the sixth embodiment, the digital data is not re-encrypted since the first recording medium 3701 is not removable from the first digital data recording apparatus 3700, i.e., is not used in another apparatus in the present embodiment.

In addition, when the digital data has been recorded on the first recording medium 3701, the primary recording unit 3703 informs the received data read/judging unit 3704 of the title code 3805 of the recorded digital data.

When informed of the title code 3805 by the primary recording unit 3703, the received data read/judging unit 3704 judges whether the secondary recording of the music is permitted on referring to the copy permission (secondary) 3804 in the attribute information 3801 in the received data primary record/judging unit 3702. When the secondary recording is not permitted, or when the permitted number of times is less than "1", the received data read/judging unit 3704 has the display unit 3104 indicate that the secondary recording is not permitted for the music.

When the secondary recording is permitted, the received data read/judging unit 3704 refers to the management information (refer to FIG. 18), reads the digital data of the title code that has been recorded on the first recording medium 3701. The received data read/judging unit 3704 informs the encryption unit 3706 of the digital data, and instructs the inherent information obtaining unit 3705 to obtain inherent information.

When having read the digital data, the received data read/judging unit 3704 decreases the number of times of the copy permission (secondary) 3804 by "1" in the attribute information 3701 that has been stored in the received data primary record/judging unit 3702. For instance, "only once" is changed to "not permitted", and "permitted" is not written since the number of times is not limited.

Note that after notifying the encryption unit 3706 of the digital data, the received data read/judging unit 3704 reads the attribute information that has been stored in the received data primary record/judging unit 3702.

When instructed to obtain inherent information by the received data read/judging unit 3704, the inherent information obtaining unit 3705 requests the inherent information obtaining/transfer unit 3707 in the second digital data recording/playback apparatus 3710 that is connected to the first digital data recording apparatus 3700 to transmit the inherent information. When informed of the inherent information by the inherent information obtaining/transfer unit 3707, the inherent information obtaining unit 3705 informs the encryption unit 3706 of the inherent information.

The encryption unit 3706 creates an encryption key according to the inherent information that has been transferred from the inherent information obtaining unit 3705, encrypts the digital data that has been transferred from the received data read/judging unit 3704, and transmits the encrypted digital data to the secondary recording unit 3708 in the second digital data recording/playback apparatus 3710. After the transmission of the encrypted digital data, the encryption unit 3706 transmits the received attribute information.

Here, an explanation of the second digital data recording/playback apparatus 3710 will be given. The second digital data recording/playback apparatus 3710 is realized by, for instance, a portable headphone stereo apparatus. The second recording medium 3709 is composed of a semiconductor memory such as an IC card that is removable from the second digital data recording/playback apparatus 3710.

When required to transmit the inherent information by the inherent information obtaining unit 3705 in the first digital data recording apparatus 3700, the inherent information obtaining/transfer unit 3707 obtains the medium identification information inherent in the second recording medium 3709 that is recorded on the second recording medium 3709 in advance and the apparatus identification information inherent in the second digital data recording/playback apparatus 3710, and informs the inherent information obtaining unit 3705 of the obtained medium identification information and apparatus identification information. Meanwhile, when instructed to inform inherent information by the reproducing information reading unit 3502, the inherent information obtaining/transfer unit 3707 informs the decryption unit 3505 of the obtained medium identification information and apparatus identification information.

When receiving the encrypted digital data and the attribute information that has been output from the encryption unit 3706 in the first digital data recording apparatus 3700, the secondary recording unit 3708 records the received encrypted digital data and the attribute information on the second recording medium 3709. In addition, the secondary recording unit 3708 records the management information 3301 shown in FIG. 18 on the second recording medium 3709. The decryption unit 3505 creates a decryption key according to the medium identification information and the apparatus identification information that have been transferred from the inherent information obtaining/transfer unit 3707, and decrypts the encrypted digital data that has been transferred from the reproducing information reading unit 3502 using the created decryption key. Note that other parts of the structure of the second digital data recording/playback apparatus 3710 are almost the same as the digital data playback apparatus in the sixth embodiment.

Here, an explanation will be given when the second recording medium 3709 is composed of an IC card that is fixed in the second digital data recording/playback apparatus 3710. In this case, since the second recording medium 3709 is only used in the second digital data recording/playback apparatus 3710, the inherent information obtaining/transfer unit 3707 obtains no medium identification information and informs the inherent information obtaining unit 3705 of the apparatus identification information that the inherent information obtaining/transfer unit 3707 stores. Meanwhile, the inherent information obtaining/transfer unit 3707 informs the decryption unit 3505 of the apparatus identification information.

As has been described, it depends on whether the second recording medium 3709 in the second digital data recording/playback apparatus 3710 is removable that an encryption key for encrypt digital data is created according to the combination of the medium identification information and the apparatus identification information or the apparatus identification information. By doing so, unauthorized duplication and reproduction of digital data can be prevented.

Here, an explanation of operations in the seventh embodiment will be given with reference to the flowchart shown in FIG. 24.

First, the received data primary record/judging unit 3702 awaits an instruction of the secondary recording of digital data from the input operation unit 3105 (step s3902), and judges whether the primary recording of the digital data is permitted on referring to the attribute information 3801 (step s3904). When the primary recording is not permitted, the received data primary record/judging unit 3702 has the display unit 3104 indicate that the primary recording is not permitted (step s3906) to complete the processing.

When the primary recording is permitted, the received data primary record/judging unit 3702 informs the primary recording unit 3703 of the digital data. The primary recording unit 3703 records the digital data and the management information on the first recording medium 3701 (step s3908).

Next, the accounting information recording unit 3109 judges whether the primary recording is charged (step s3910), and records the accounting information on the accounting information recording medium 3110 when the primary recording is charged (step s3912).

Then, the received data read/judging unit 3704 judges whether the secondary recording of the digital data that has been recorded on the first recording medium 3701 is permitted on referring to the attribute information 3801 that has been stored in the received data primary record/judging unit 3702 (step s3914). When the secondary recording is not permitted, the received data read/judging unit 3704 has the display unit 3104 indicate that the secondary recording is not permitted (step s3916) to complete the processing.

When the secondary recording is permitted, the received data read/judging unit 3704 reads the digital data from the first recording medium 3701, informs the encryption unit 3706 of the read digital data, and instructs the inherent information obtaining unit 3705 to obtain the inherent information from the second digital data recording playback apparatus 3710. The inherent information obtaining unit 3705 obtains the inherent information and informs the encryption unit 3706 of the obtained inherent information (step s3918). The encryption unit 3706 creates an encryption key according to the received inherent information (step s3920), encrypts the received digital data, and outputs the encrypted digital data to the secondary recording unit 3708 in the second digital data recording/playback apparatus 3710.

The secondary recording unit 3708 records the encrypted digital data, the attribute information, and the management information on the secondary recording medium 3709 (step s3922).

The accounting information recording unit 3109 judges whether the secondary recording is charged (step s3924), and records the accounting information on the accounting information recording medium 3110 when the secondary recording is charged (step s3926) to complete the processing.

Note that operations in reproducing the digital data by the second digital data recording/playback apparatus 3710 are almost the same as operations by the digital data playback apparatus in the sixth embodiment, so that no explanation will be given.

Another Example

While the digital data is encrypted in the seventh embodiment using the encryption key according to the combination of the apparatus identification information of the second digital data recording/playback apparatus 3710 and the medium identification information of the second recording medium 3709 when the second recording medium 3709 is removable, the form of encryption is designated by the user (it is designated by the user whether the encryption key is created according to only the medium identification information or the combination of the medium identification information and the apparatus identification information) to increase the degree of freedom of usage patterns in this another example of the seventh embodiment. More specifically, when reproduced with the second digital data recording/playback apparatus 3710, the digital data of music that has been recorded on the second recording medium 3709 is encrypted using the medium identification information and the apparatus identification information at the time of recording. When reproduced with another digital data playback apparatus (an apparatus that decrypts encrypted digital data using the medium identification information as the decryption key), the digital data is encrypted using the medium identification information at the time of recording. As a result, the form of encryption can be selected according to the usage pattern.

On the other hand, the secondary recording charges are determined according to the degree of freedom of usage pattern to protect the copyright.

Here, an explanation of the structure of the first digital data recording apparatus and the second digital data recording/playback apparatus in the other example of the seventh embodiment will be given. Note that the functions of the first digital data recording apparatus and the second digital data recording/playback apparatus in this example are realized by adding a few functions to those of the first digital data recording apparatus 3700 shown in FIG. 22. As a result, an explanation of only the parts of structure that are different from the seventh embodiment will be given with reference to FIG. 22 that has been used in the explanation of the seventh embodiment.

FIG. 25 shows part of attribute information 31001 that is stored in the received data primary record/judging unit 3702.

The attribute information 31001 is different from the attribute information 3801 shown in FIG. 23 in the contents of the secondary recording charges 3802 and secondary recording charges 31002.

A secondary recording charge 31002 depends on whether the encryption key used in the encryption of digital data is created according to the medium identification information (medium ID) 31003, the apparatus identification information (apparatus ID) 31004, or the combination of the medium identification information and the apparatus identification information. When the encryption key has been created according to the medium identification information 31003, the music data can be reproduce by using the second recording medium 3709 in another apparatus and the degree of freedom of the user is increased. As a result, the secondary recording charge (secondary replication charge) is higher than when the encryption key has been created according to the apparatus identification information 31004 and the combination of the medium identification information and the apparatus identification information 31005. By doing so, the replication charge is determined according to the usage pattern.

When informed of the apparatus identification information and the medium identification information from the inherent information obtaining/transfer unit 3707, the inherent information obtaining unit 3705 has the display unit 3104 indicate whether the second recording medium 3709 is used in the second digital data recording/playback apparatus 3710 or in another apparatus to await the user selection.

The user designates the second digital data recording/playback apparatus 3710 or another apparatus using the input operation unit 3105, i.e., to create the encryption key according to the medium identification information or to create the encryption key according to the combination of the medium identification information and the apparatus identification information.

The input operation unit 3105 informs the received data primary record/judging unit 3702 of the user's designation.

When informed by the input operation unit 3105 that another apparatus is to be used, the received data primary record/judging unit 3702 informs the accounting information recording unit 3109 that the secondary recording charge 31002 is determined according to the encryption key that is created using the medium identification information 31003. On the other hand, when informed that only the second digital data recording/playback apparatus is to be used, the received data primary record/judging unit 3702 informs the accounting information recording unit 3109 that the secondary recording charge 31002 is determined according to the encryption key that is created using the combination of the medium identification information and the apparatus identification information 31005.

When informed by the input operation unit 3105 that another apparatus is to be used, the inherent information obtaining unit 3705 informs the encryption unit 3706 of only the medium identification information 31003. On the other hand, when informed by the input operation unit 3105 that only the second digital data recording/playback apparatus 3710 is to be used, the inherent information obtaining unit 3705 informs the encryption unit 3706 of the combination of the medium identification information and the apparatus identification information 31005.

When informed by the encryption unit 3706 that the encrypted digital data has been transmitted to the secondary recording unit 3708, the accounting information recording unit 3109 refers to the secondary recording charge 31002 in the attribute information 31001 that has been informed of by the received data primary record/judging unit 3702, and records the accounting information on the accounting information recording medium 3110.

Note that it is needless to say that, in this example, when the second recording medium 3709 is a removable DVD-RAM, the encryption key can be created only according to the identification information inherent to the DVD-RAM, the digital data can be re-encrypted using the created encryption key, and the re-encrypted digital data can be recorded as in the case of the sixth embodiment.

Meanwhile, operations in this example are essentially the as in the seventh embodiment, so that no explanation will be given.

Note that it is possible to suppose that the accounting information recording media 3110 and 3508 are realized by IC cards, for instance, and the digital data is not recorded and reproduced without setting the IC cards in the sixth and seventh embodiments and in the example.

In addition, while the digital data that is received by the communication unit 3110 has been supposed to be music data in the sixth and seventh embodiments and in the example, the digital data can be video data, audio data, character data, and the combination of them.

While the structures of the digital data recording apparatus, the digital data playback apparatus, and the digital data recording/playback apparatus are shown in FIGS. 16, 20, and 22, it is possible to record a program realizing the functions of the elements on a computer-readable recording medium such as a floppy disk, to use the computer-readable recording medium in a digital data recording/playback apparatus that has no function of protecting copyrights, and to have the digital data recording/playback apparatus has a function of protect copyrights.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A digital data recording apparatus for recording digital data on a recording medium, said apparatus comprising:
   a communication unit operable to receive encrypted digital data via a digital network;
   a decryption unit operable to decrypt the encrypted digital data received by said communication unit;
   an encryption unit including a plurality of encryption sub-units operable to re-encrypt decrypted digital data in encryption systems having different security levels;
   a recording unit operable to record digital data that has been re-encrypted by said encryption unit on the recording medium;
   an accounting unit operable to conduct an accounting process via the digital network; and
   a controller operable to control said decryption unit, said encryption unit and said accounting unit;
   wherein said controller is operable to select and control one of said encryption sub-units from among said plurality of encryption sub-units to re-encrypt the digital data that has been decrypted by said decryption unit, to determine an accounting value according to said one of said encryption sub-units that has re-encrypted the decrypted digital data, and to control said accounting unit so that said accounting unit conducts the accounting process according to the determined accounting value.

2. The digital data recording apparatus according to claim 1, wherein:
   the digital data recorded on the recording medium is reproduced by a playback apparatus;
   said encryption unit includes
      a first encryption sub-unit operable to re-encrypt digital data by using an encryption key that has been created according to identification information of the recording medium, and
      a second encryption sub-unit operable to re-encrypt digital data by using an encryption key that has been created according to identification information of the playback apparatus; and
   said controller is operable to determine whether the recording medium is removable from the playback apparatus, to control said first encryption sub-unit to re-encrypt the decrypted digital data when the recording medium is removable from the playback apparatus, and to control said second encryption sub-unit to re-encrypt the decrypted digital data when the recording medium is not removable from the playback apparatus.

3. The digital data recording apparatus according to claim 2, wherein said controller is operable to prohibit said decryption unit from decrypting the encrypted digital data when said encryption unit fails to create an encryption key.

4. The digital data recording apparatus according to claim 1, wherein the security levels of the encryption systems in which said plurality of encryption sub-units re-encrypt the decrypted digital data are lower than the security levels of encryption systems in which encrypted digital data to be received by said communication unit have been encrypted.

5. The digital data recording apparatus according to claim 1, wherein
   the encrypted digital data received by said communication unit is encrypted in one of the encryption systems having different security levels and includes attribute information indicating the one of the encryption systems in which the encrypted digital data has been encrypted,
   said decryption unit includes a plurality of decryption sub-units operable to decrypt the encrypted digital data that have been encrypted in the encryption systems, and
   said controller is operable to determine the one of the encryption systems in which the encrypted digital data has been encrypted according to the attribute information, and to control said decryption unit so that one of said plurality of decryption sub-units corresponding to the determined one of the encryption systems decrypts the encrypted digital data.

6. The digital data recording apparatus according to claim 5, wherein said controller is operable to determine the accounting value according to said one of said decryption sub-units that has decrypted the encrypted digital data and said one of said encryption sub-units that has re-encrypted the decrypted digital data, and to control said accounting unit so that said accounting unit conducts the accounting process according to the determined accounting value.

7. A digital data recording method of recording digital data on a recording medium, said method comprising:
   receiving encrypted digital data via a digital network;
   decrypting the encrypted digital data received in said receiving of the encrypted digital data;

re-encrypting decrypted digital data in one of a plurality of encryption systems having different security levels;

recording digital data that has been re-encrypted in said re-encrypting of the decrypted digital data on the recording medium;

conducting an accounting process via the digital network; and controlling said decrypting of the encrypted digital data, said re-encrypting of the decrypted digital data, and said conducting of the accounting process, wherein said re-encrypting of the decrypted digital data is controlled to re-encrypt the digital data that has been decrypted in said decrypting of the encrypted digital data by using one of the plurality of encryption systems, an accounting value is determined according to the one of the plurality of encryption systems used to re-encrypt the decrypted digital data, and said conducting of the accounting process is controlled to conduct the accounting process according to the determined accounting value.

8. The digital data recording method according to claim 7, wherein:

the encrypted digital data received in said receiving of the encrypted digital data has been encrypted in one of the plurality of encryption systems having different security levels and includes attribute information indicating the one of the plurality of encryption systems in which the encrypted digital data has been encrypted;

said method further comprising determining the one of the plurality of encryption systems according to the attribute information; and said decrypting of the encrypted digital data decrypts the encrypted digital data according to the determined one of the plurality of encryption systems as determined in said determining of the one of the plurality of encryption systems.

9. A computer-readable recording medium that is applied to a digital data recording apparatus for recording digital data on another recording medium, said computer-readable recording medium having a program stored thereon to control a computer to execute a method of recording the digital data on the another recording medium, said method comprising:

receiving encrypted digital data via a digital network;

decrypting the encrypted digital data received in said receiving of the encrypted digital data;

re-encrypting decrypted digital data in one of a plurality of encryption systems having different security levels;

recording digital data that has been re-encrypted in said re-encrypting of the decrypted digital data on the recording medium;

conducting an accounting process via the digital network; and controlling said decrypting of the encrypted digital data, said re-encrypting of the decrypted digital data, and said conducting of the accounting process, wherein said re-encrypting of the decrypted digital data is controlled to re-encrypt the digital data that has been decrypted in said decrypting of the encrypted digital data by using one of the plurality of encryption systems, an accounting value is determined according to the one of the plurality of encryption systems used to re-encrypt the decrypted digital data, and said conducting of the accounting process is controlled to conduct the accounting process according to the determined accounting value.

10. The computer-readable recording medium according to claim 9, wherein:

the encrypted digital data received in said receiving of the encrypted digital data has been encrypted in one of the plurality of encryption systems having different security levels and includes attribute information indicating the one of the plurality of encryption systems in which the encrypted digital data has been encrypted;

said method further comprising determining the one of the plurality of encryption systems according to the attribute information; and said decrypting of the encrypted digital data decrypts the encrypted digital data according to the determined one of the plurality of encryption systems as determined in said determining of the one of the plurality of encryption systems.

* * * * *

UNITED STATES PATENT AND TRADEMARK OFFICE
CERTIFICATE OF CORRECTION

| | |
|---|---|
| PATENT NO. | : 6,834,348 B1 |
| DATED | : December 21, 2004 |
| INVENTOR(S) | : Kenji Tagawa et al. |

It is certified that error appears in the above-identified patent and that said Letters Patent is hereby corrected as shown below:

Title page,
Item [56], References Cited, FOREIGN PATENT DOCUMENTS, please insert:
-- JP 10-150653 6/98 --.
Item [57], ABSTRACT,
Please replace with the following:

--A data communication unit receives encrypted digital data via a network and records the digital data on a primary recording medium. The digital data, having been encrypted in different encryption systems according to the distributers, include attribute information indicating the encryption systems. The encryption system of the digital data is determined and the encrypted data is decrypted by an appropriate decryption unit. Identification information of a secondary recording medium or a playback apparatus is obtained according to whether the secondary recording medium is removable from the playback apparatus. A controller selects an encryption unit among a plurality of encryption units according to the obtained identification information. The selected encryption unit creates an encryption key according to the identification information and re-encrypts the digital data. A recording unit records the digital data on the secondary recording medium. An accounting unit charges according to accounting information in the attribute information.--

Signed and Sealed this

Fifth Day of April, 2005

JON W. DUDAS
*Director of the United States Patent and Trademark Office*